United States Patent [19]
Hirotsune et al.

[11] Patent Number: 5,882,759
[45] Date of Patent: Mar. 16, 1999

[54] INFORMATION RECORDING MEDIUM AND INFORMATION MEMORY STORAGE

[75] Inventors: Akemi Hirotsune, Higashimurayama; Motoyasu Terao, Tokyo; Yasushi Miyauchi, Akishima; Makoto Miyamoto, Ome, all of Japan

[73] Assignees: Hitachi, Ltd., Tokyo; Hitachi Maxell, Ltd., Osaka, both of Japan

[21] Appl. No.: 902,361

[22] Filed: Jul. 29, 1997

[30] Foreign Application Priority Data

Jul. 31, 1996 [JP] Japan .................................. 8-201535

[51] Int. Cl.[6] ..................................... B32B 3/00
[52] U.S. Cl. ....................... 428/64.1; 428/64.4; 428/64.5; 428/64.6; 428/64.7; 428/457; 428/913; 430/270.13; 430/495.1; 430/945; 369/275.4; 369/283; 369/288
[58] Field of Search .................................. 428/64.1, 64.2, 428/64.4, 64.5, 64.6, 64.7, 457, 913; 430/270.12, 270.13, 495.1, 945; 369/275.1, 275.4, 283, 288

[56] References Cited

U.S. PATENT DOCUMENTS

| 5,479,382 | 12/1995 | Nishida et al. | 369/13 |
| 5,650,992 | 7/1997 | Ohkubo | 369/275.1 |
| 5,703,867 | 12/1997 | Miyauchi et al. | 369/275.3 |
| 5,709,978 | 1/1998 | Hirotsune et al. | 430/270.13 |

OTHER PUBLICATIONS

SPIE vol. 1078 Optical Data Storage Topical MEeting (1989), "Million Cycle Overwritable Phase Change Optical Disk Media", T. Ohta et al, pp. 27–34.

41st Applied Physics Joint Lecture Meeting, A. Hirotsune et al, p. 1000.

NEC Device Res. Labs., NEC Corporation, "Relation between mark edge recording characteristics and thermal properties of phase change media", S. Ohkubo et al, pp. 98–99.

Japan Journal of Applied Physics, vol. 32, 1993, "Premastered Optical Disk by Superresolution", K. Yasuda et al, pp. 5210–5213.

Primary Examiner—Elizabeth Evans
Attorney, Agent, or Firm—Fay, Sharpe, Beall, Fagan, Minnich & McKee

[57] ABSTRACT

An information recording medium which comprises as a recording layer an information recording thin layer, formed on a substrate directly or via an underlayer, which records and/or reads back information through the use of atomic arrangement change caused by the irradiation of energy beams, a protective layer and at least two reflective layers, the reflective layers including a first reflective layer and a second reflective layer, the materials of which differ in refractive index or extinction coefficient or both, the aforesaid layers being laminated in the order, from the side of light incidence, of the protective layer, the recording layer, an intermediate layer, the first reflective layer and the second reflective layer.

17 Claims, 7 Drawing Sheets

INFORMATION RECORDING MEDIUM AND INFORMATION MEMORY STORAGE

BACKGROUND OF THE INVENTION

The present invention relates to an optical information recording medium which is capable of recording and reading back information.

Various principles are known which are used for recording information on a thin layer (i.e., recording layer) by irradiation of laser light. Among these principles, those which make use of a phase transition (also called "phase change") of layer materials or of a change of atomic arrangement caused by irradiation of laser light (e.g., photodarkening) have an advantage in that they can give an information recording medium of double-sided disk structure by directly laminating two disk members because they are accompanied by little deformation of the thin layers. Furthermore, recording layers of GeSbTe or similar type have the advantage of permitting the rewriting of information.

In a recording layer of this kind, however, when the layer is subjected to a large number (exceeding $10^4$) of times of rewriting by means of a sample servo system or a mark edge recording, which are conducted for attaining a high density recording, the recording layer thickness changes as the result of a flow of the recording layer and the wave form of the reproduced signal undergoes distortion. The cause of the flow of the recording layer is presumably that the recording layer becomes flowable by the laser beam irradiation at the time of recording and the recording layer is pushed little by little as the result of deformation of the protective layer and the intermediate layer caused by thermal expansion.

For example, reference 1 (T. Ohta et al., "Optical data Storage", '89 Proc. SPIE, 1078, 27 (1989)) discloses a method of preventing the flow of the recording layer by decreasing the thickness of the recording layer to reduce its heat capacity and making use of the resultant increase in the effect of the adhesive force of the layer with adjacent layers. Reference 2 (Hirotsune, Terao, Miyauchi, Minemura and Fushimi, Collection of preliminary papers for 41th applied physics joint lecture meeting, p. 1000) discloses a method of preventing the flow of the recording layer by adding a high melting point ingredient. These methods can suppress the flow of the recording layer to a certain extent. However, when a large, number of times of rewriting is repeated, the fluctuation of reflectivity level takes place.

To improve the overwrite jitter characteristic in mark edge recording, a disk increased in transmitted light intensity has been proposed in reference 3 (Okubo, Murahata, Ide, Okada and Iwanaga, Collection of preliminary papers for 5th phase change recording symposium, p. 98). The disk has a structure of PC substrate/ZnS—SiO$_2$ (250 nm)/Ge$_2$Sb$_2$Te$_5$ (15 mm)/ZnS—SiO$_2$ (18 nm)/Si (65 nm).

On the other hand, in optical disks obtained by replicating, as surface unevenness on the substrate surface, analog information signals produced by the FM modulation of image signals and sound signals and digital information signals, such as electronic computer data, facsimile signals and digital audio signals, and in optical disks having information recording thin layers or the like which are capable of recording signals and data at the real time by means of recording beams, such as laser beams and electron beams.

The signal readback resolution is almost entirely determined by the wavelength $\lambda$ of the light source of the reproduction optical system and the numerical aperture NA of the objective lens, the recording mark period 2NA/$\lambda$ representing the reading limit.

As to the means for obtaining a high density recording, a method in which data recorded by ruggedness are read back by using a medium which changes its reflectivity by phase change and the medium used therein are described in reference 4 (K. Yasuda, M. Ono, K. Aritani, A. Fukumoto, M. Kaneko; Jpn, J. Appl. Phys. vol. 32 (1993), p. 5210). In this method, also, the layer for ultra-high resolution reading undergoes flowing of the layer and gives rise to fluctuation of reflectivity level when subjected to a very large number, exceeding $10^4$, of times of reading, so that the possible number of times of reading is restricted.

In the present specification, the term "phase change" is used not only to indicate the phase change between the crystalline and the amorphous states but also to imply the phase change of melting (i.e., change into liquid phase) and recrystallization and the phase change between the crystalline and another crystalline states.

SUMMARY OF THE INVENTION

Previous information recording media, when used as a rewritable information recording medium of phase change type, all present the problem of giving rise to the increase of jitter and the fluctuation of reflectivity level as the number of times of rewriting is increased.

Similarly, previous information recording media having an ultrahigh resolution reading layer, when used as an ultrahigh resolution readable information recording medium of phase transition type, all present the problem of giving rise to the fluctuation of reflectivity level as the possible number of times of ultrahigh resolution reading is increased.

Thus, the object of the present invention is to provide an information recording medium which, even after a large number of times of rewriting or ultrahigh resolution reading, maintains a good read/write characteristic and gives rise to less jitter increase and less reflectivity level fluctuation than previous media.

The characteristic features of the present invention lie in the following (1)–(39).

(1) An information recording medium which comprises as a recording layer an information recording thin layer, formed on a substrate directly or via an underlayer, which records and/or reads back information through the use of atomic arrangement change caused by the irradiation of energy beams, a protective layer and at least two reflective layers, the reflective layers comprising the first reflective layer and the second reflective layer the materials of which differ in refractive index or extinction coefficient or both, the aforesaid layers being laminated in the order, from the side of light incidence, of the protective layer, the recording layer and then, directly or via an intermediate layer, the first reflective layer and the second reflective layer.

(2) The information recording medium described in (1) wherein the component which constitutes 90% or more of the total number of atoms of the first reflective layer is at least one member selected from the group consisting of Si—Ti, Si—Mo and Si—Al.

(3) The information recording medium described in (1) wherein the component which constitutes 90% or more of the total number of atoms of the first reflective layer is at least one member selected from the group consisting of Si—Ge and Ge.

(4) The information recording medium described in (1) wherein the component which constitutes 90% or more of the total number of atoms of the first reflective layer is Si.

(5) The information recording medium described in (1) wherein the component which constitutes 90% or more of the total number of atoms of the second reflective layer is at least one member selected from the group consisting of Al—Ti, Al—Ag, Al—Cu and Al—Cr.

(6) The information recording medium described in (1) wherein the component which constitutes 90% or more of the total number of atoms of the second reflective layer is at least one member selected from the group consisting of Al, Au, Cu and Mo.

(7) The information recording medium described in (1) wherein the component which constitutes 90% or more of the total number of atoms of the first reflective layer is Si and the component which constitutes 90% or more of the total number of atoms of the second reflective layer is at least one member selected from the group consisting of Al—Ti, Al—Ag, Al—Cu and Al—Cr.

(8) The information recording medium described in (1) wherein the component which constitutes 90% or more of the total number of atoms of the first reflective layer is at least one member selected from the group consisting of Si—Ti, Si—Mo and Si—Al and the component which constitutes 90% or more of the total number of atoms of the second reflective layer is at least one member selected from the group consisting of Al—Ti, Al—Ag, Al—Cu and Al—Cr.

(9) The information recording medium described in (1) wherein the component which constitutes 90% or more of the first reflective layer is at least one member selected from the group consisting of Si, Si—Ti, Si—Mo, Si—Al, Si—Ge and Ge and the component which constitutes 90% or more of the total number of atoms of the second reflective layer is at least one member selected from the group consisting of Mo and Mo compounds.

(10) The information recording medium described in any one of (1)–(9) wherein the components which constitute 90% or more of the total number of atoms of the recording layer consist essentially of 1–5 atomic % of Ag, 17–25 atomic % of Ge, 19–25 atomic % of Sb and 53–59 atomic % of Te.

(11) The information recording medium described in any one of (1)–(9) wherein the component which constitutes 90% or more of the total number of atoms of the recording layer consists essentially of 5–15% of a material having a composition near to $AgSbTe_2$ and the remaining percentage of a material having a composition near to $Ge_2Sb_2Te_5$.

(12) The information recording medium described in any one of (1)–(11) wherein the first reflective layer is directly laminated onto the recording layer.

(13) The information recording medium described in any one of (1)–(11) wherein an intermediate layer is provided between the recording layer and the first reflective layer.

(14) The information recording medium described in (13) wherein the intermediate layer consists essentially of two layers of a $ZnS$—$SiO_2$ layer and an Al oxide layer.

(15) The information recording medium described in (13) wherein the component which constitutes 30% or more of the total number of atoms of the intermediate layer has a composition of Al—O.

(16) The information recording medium described in (13) wherein the component(s) which constitute(s) 90% or more of the total number of atoms of the intermediate layer has (have) a composition near to at least one of the compositions $(ZnS)$—$(Al_2O_3)$, $(ZnS)$—$(Al_2O_3)$—$(SiO_2)$ and $(Al_2O_3)$—$(SiO_2)$

(17) The information recording medium described in any one of (1)–(16) wherein the protective layer consists essentially of a material which contains 30 atomic % or more, of the total number of atoms, of Al—O.

(18) The information recording medium described in any one of (1)–(16) wherein the protective layer consists essentially of a $ZnS$—$SiO_2$ layer and an Al—O layer.

(19) The information recording medium described in (18) wherein the thickness of the Al—O layer in the protective layer is not less than 2 nm and not more than 20 nm.

(20) The information recording medium described in any one of (1)–(16) wherein the component(s) which constitute(s) 90% or more of the total number of atoms has (have) a composition near to at least one of the compositions $(ZnS)$—$(Al_2O_3)$ and $(ZnS)$—$(Al_2O_3)$—$(SiO_2)$.

(21) The information recording medium described in any one of (1)–(20) wherein the thickness of the recording layer is in the range of not less than 15 nm and not more than 40 nm.

(22) The information recording medium described in any one of (1)–(21) wherein the thickness of the protective layer is in the range of not less than 80 nm and not more than 110 nm.

(23) The information recording medium described in any one of (13)–(16) wherein the thickness of the intermediate layer is in the range of not less than 15 nm and not more than 30 nm.

(24) The information recording medium described in any one of (1)–(23) wherein the thickness of the first reflective layer is in the range of not less than 60 nm and not more than 90 nm.

(25) The information recording medium described in any one of (1)–(24) wherein the thickness of the second reflective layer is in the range of not less than 150 nm and not more than 250 nm.

(26) An information recording medium which comprises as a recording layer or a mask layer for ultrahigh resolution reading of information, formed on a substrate directly or via an underlayer, which records and/or reads back information through the use of the atomic arrangement change caused by the irradiation of energy beams, and a reflective layer, the reflectivity at the crystalline state and/or amorphous state having the minimum value in the wavelength range of not less than 550 nm and not more than 800 nm.

(27) An information recording medium which comprises as a recording layer an information recording thin layer, formed on a substrate directly or via an underlayer, which records and/or reads back information through the use of the atomic arrangement change caused by the irradiation of energy beams, and a reflective layer, the reflectivity of the reflective layer for light incident thereupon from the recording layer side having a difference between the maximum value and the minimum value of not less than 20% in the wavelength range of not less than 500 nm and not more than 850 nm.

(28) An information recording medium which comprises as a recording layer an information recording thin layer, formed on a substrate directly or via an underlayer, which records and/or reads back information through the use of the atomic arrangement change caused by the irradiation of energy beams, and a reflective layer, the reflectivity of the reflective layer for light incident thereupon from the recording layer side having the minimum value in the wavelength range of not less than 500 nm and not more than 850 nm.

(29) The information recording medium described in (1) wherein the protective layer is prepared by a method comprising forming the layer in a thickness somewhat larger than the intended ultimate thickness and then working it into a proper thickness by means of etching.

(30) The information recording medium described in (1) wherein the first reflective layer is prepared by a method comprising forming the layer in a thickness somewhat larger than the intended ultimate thickness and then working it into a proper thickness by means of etching.

(31) The information recording medium described in (1) wherein the first reflective layer is formed such that the layer thickness at the land part is 2 nm or more larger than that at the groove part.

(32) The recording layer in the present invention consists essentially of materials of Ag—Ge—Sb—Te type, e.g., $Ag_2Ge_{20}Sb_{22}Te_{56}$, $Ag_5Ge_{20}Sb_{20}Te_{55}$ and $Ag_1Ge_{21}Sb_{23}Te_{55}$.

It was found that among the Ag—Ge—Sb—Te type materials, particularly those having a composition in the range of 1–5 atomic % of Ag, 17–23 atomic % of Ge, 19–25 atomic % of Sb and 53–59 atomic % of Te, tended little to show the decrease of possible number of times of rewriting. It was also found that recording layer materials consisting essential of 5–15% of $AgSbTe_2$ or materials of similar composition and the remaining part of $Ge_2Sb_2Te_5$ or materials of similar composition was favorable because they showed large difference in reflectivity between the crystalline state and the amorphous state and gave large reproduced signals.

Secondly thereto, materials of the Cr—Ge—Sb—Te type, Co—Ge—Sb—Te type, V—Ge—Sb—Te type and a similar type, for example $((Cr_4Te_5)_{10}(Ge_2Sb_2Te_5)_{90})$, though showing an increased jitter after 30,000 times or more of rewriting, also gave similar good results in many other characteristic properties.

Further, also, when the above-mentioned materials are replaced by at least one such material other than described above as $Ge_2Sb_2Te_5$, $GeSb_2Te_4$, $GeSb_4Te_7$, $In_3SbTe_2$, $In_{35}Sb_{32}Te_{33}$, $In_{31}Sb_{26}Te_{43}$, GeTe, Ag—In—Sb—Te, Ni—Ge—Sb—Te, Pt—Ge—Sb—Te, Si—Ge—Sb—Te, Au—Ge—Sb—Te, Cu—Ge—Sb—Te, Mo—Ge—Sb—Te, Mn—Ge—Sb—Te, Fe—Ge—Sb—Te, Ti—Ge—Sb—Te, Bi—Ge—Sb—Te and a material having a composition near thereto, or when part of the Ge in the above materials is replaced by In, characteristic properties near to those described above can be obtained.

Further, recording layers which comprise a phase-changeable component containing ge—Sb—Te as the main constituent and a high melting component having a higher melting point tend little to show the decrease of possible number of times of rewriting. The recording layer tends still less to show the decrease of possible number of times of rewriting when 95% or more of the total number of atoms of the phase-changeable component constitute a combination of GeTe and $Sb_2Te_3$ and 95% or more of the total number of atoms of the high melting point component constitute at least one composition selected from Cr—Te, Cr—Sb, Cr—Ge, Cr—Sb—Te, Cr—Sb—Ge, Cr—Ge—Te, Co—Te, Co—Sb, Co—Ge, Co—Sb—Te, Co—Sb—Ge, Co—Ge—Te, Cu—Te, Cu—Sb, Cu—Ge, Cu—Sb—Te, Cu—Sb—Ge, Cu—Ge—Te, Mn—Te, Mn—Sb, Mn—Ge, Mn—Sb—Te, Mn—Sb—Ge, Mn—Ge—Te, V—Te, V—Sb, V—Ge, V—Sb—Te, V—Sb—Ge, V—Ge—Te, Ni—Te, Ni—Sb, Ni—Ge, Ni—Sb—Te, Ni—Sb—Ge, Ni—Ge—Te, Mo—Te, Mo—Sb, Mo—Ge, Mo—Sb—Te, Mo—Sb—Ge, Mo—Ge—Te, W—Te, W—Sb, W—Ge, W—Sb—Te, W—Sb—Ge, W—Ge—Te, Ag—Te, Ag—Sb, Ag—Ge, Ag—Sb—Te, Ag—Sb—Te, Ag—Sb—Ge and Ag—Ge—Te or a composition near thereto. It was found that Cr—Te as $Cr_4Te_5$, $Cr_2Te_3$ and $Cr_5Te_8$ gave a particularly low jitter after $10$–$10^4$ times of rewriting. It was also found that $Ag_2Te$, $AgSbTe_2$ or the like gave a high signal strength even with a light source of shorter wavelength and thus Ag—Te and Ag—Sb—Te were particularly preferable.

When the composition which constitutes 95% or more of the total number of atoms of the phase-changeable component is $Ge_2Sb_2Te_5$, a good rewriting characteristic is obtained when the proportion of the number of atoms of the high melting component to the total number of atoms in the recording layer is not less than 5 atomic % and not more than 20 atomic %. Particularly when the proportion is not less than 5 atomic % and not more than 15 atomic %, a good erasing characteristic and hence a better rewriting characteristic can be obtained.

The content of impurity elements in the recording layer is preferably not more than 10 atomic %, more preferably not more than 5 atomic %, based on the recording layer components, because then the deterioration of rewriting characteristic can be decreased.

(33) The protective layer in the present invention is a layer or a multi-layer of such materials as $(ZnS)_{80}(SiO_2)_{20}$, materials obtained by varying the mixing ratio of ZnS and $SiO_2$ therein; Si—N type materials; Si—O—N type materials; oxides, such as $SiO_2$, SiO, $TiO_2$, $Al_2O_3$, $Y_2O_3$, CeO, $La_2O_3$, $In_2O_3$, $GeO_2$, PbO, SnO, $SnO_2$, $Bi_2O_3$, $TeO_2$, $WO_2$, $WO_3$, $Sc_2O_3$, $Ta_2O_5$ and $ZrO_2$; nitrides, such as TaN, AlN, $Si_3N_4$ and Al—Si—N type materials (e.g., $AlSiN_2$); sulfides, such as ZnS, $Sb_2S_3$, CdS, $In_2S_3$, $Ga_2S_3$, GeS, $SnS_2$, PbS and $Bi_2S_3$; selenides, such as $SnSe_2$, $Sb_2Se_3$, CdSe, ZnSe, $In_2Se_3$, $Ga_2Se_3$, GeSe, $GeSe_2$, SnSe, PbSe and $Bi_2Se_3$; fluorides, such as $CeF_3$, $MgF_2$ and $CaF_2$; or Si, Ge, $TiB_2$, $B_4C$, B and C; materials having a composition near to those described above; and mixtures of these materials.

(34) The materials for the intermediate layer in the present invention are $Al_2O_3$, Al oxide wherein the composition ratio of Al to O deviates from 2 t 3, $(ZnS)_{80}(SiO_2)_{20}$; materials obtained by changing the mixing ratio of ZnS and $SiO_2$ therein, Si—N type materials, Si—O—N type materials; oxides, such as $SiO_2$, SiO, $TiO_2$, $Al_2O_3$, $Y_2O_3$, CeO, $La_2O_3$, $In_2O_3$, GeO, $GeO_2$, PbO, SnO, $SnO_2$, $Bi_2O_3$, $TeO_2$, $WO_2$, $WO_3$, $Sc_2O_3$, $Ta_2O_5$ and $ZrO_2$; nitrides, such as TaN, AlN, $Si_3N_4$ and Al—Si—N type materials (e.g., $AlSiN_2$); sulfides, such as ZnS, $Sb_2S_3$, CdS, $In_2S_3$, $Ga_2S_3$, GeS, $SnS_2$, PbS and $Bi_2S_3$; selenides, such as $SnSe_2$, $Sb_2Se_3$, CdSe, ZnSe, $In_2Se_3$, $Ga_2Se_3$, GeSe, $GeSe_2$, SnSe, PbSe and $Bi_2Se_3$; fluorides, such as $CeF_3$, $MgF_2$ and $CaF_2$; or Si, Ge, $TiB_2$, $B_4C$, B, and C; or materials having a composition near to those described above.

(35) The substrate in the present invention may be a polycarbonate substrate provided with a continuous groove directly onto the surface or a chemically reinforced glass plate which has a polyolefin, epoxy resin, acrylic resin or ultraviolet-curable resin layer formed on the surface.

Besides the substrate of continuous groove format, it may also be a substrate of sample servo format and a substrate based on another format.

It may also be a substrate having a format which enables recording and reading back both on the groove part and on the land part. The disk size is not limited to 12 cm but may be other sizes, e.g., 13 cm, 3.5' and 2.5'. The disk thickness also is not limited to 0.6 m but may be other thickness, e.g., 1.2 mm and 0.8 mm.

(36) The material for the first reflective layer in the present invention may be Si or Si containing Au, Ag, Cu, Al, Ni, Fe, Co, Cr, Ti, Pd, Pt, W, Ta, Mo, Sb, Bi, Dy, Cd, Mn, Mg, V, Zn, Ga, Tl, Pb, C, B or S added thereto.

The content of the added element is preferably not less than 1 atomic % and not more than 25 atomic %, because then the layer tends less to show the fluctuation of reflectivity level in a large number of times of rewriting.

When the material of the reflective layer is a Si—Ge mixed material, the light absorptivity of the recording mark part can be made smaller than that of the parts other than the recording mark, hence incomplete erasing due to light absorptivity difference can be prevented and the recording layer tends still less to show the decrease of possible number of times of rewriting. The content of Ge is preferably not less than 10 atomic % and not more than 80 atomic % because then the resulting layer tends less to show the decrease of possible number of times of rewriting.

Similar good results are obtained when the material for the first reflective layer is a Si—N, Si—Sn or Si—In mixed material, or the mixture of two or more of these mixed materials. These reflective layer materials, not only when used together with the phase-change layer of the present invention but also when used as the material of the reflective layer used together with other phase-change layers, give rise to less decrease of the number of times of rewriting than previous reflective layer materials. The content of the element added to Si is preferably not less than 3 atomic % and not more than 50 atomic % to suppress the decrease of possible number of times of rewriting.

Further, the first reflective layer may be a layer formed of a mixed material containing Si and Ge other than those described above, a layer formed of a material which has a high refractive index and low extinction coefficient, a multilayer formed of such layers, and a composite layer formed of such layers combined with a layer of other substances, such as oxides. There may also be used for the layer Ge, various nitrides, sulfides and selenides.

Materials other than those described above which have a refractive index of 3 or more and an extinction coefficient of 2 or less at the recording wavelength or the reading back wavelength may also be used.

Si and the materials used in place of Si, used for the first reflective layer, preferably constitute 90% or more of the total number of atoms of the first reflective layer. When the content of impurities other than the above-mentioned materials is 10 atomic % or more, the deterioration of the rewriting characteristic is observed.

(37) The materials for the second reflective layer in the present invention may be Al alloys, such as Al—Ti, Al—Ag, Al—Cu and Al—Cr, and materials comprising Al as the main component.

The reflective layer may also use a layer of an Al alloy other than those described above, such single elements as Au, Ag, Cu, Al, Ni, Fe, Co, Cr, Ti, Pd, Pt, W, Ta, Mo, Sb, Bi, Dy, Cd, Mn, Mg and V, or alloys containing these elements as the main component, such as Au alloy, Ag alloy, Cu alloy, Pd alloy, Pt alloy, Sb—Bi, SUS, and Ni—Cr, or alloys of these elements with each other; or it may be a multilayer consisting essentially of these layers, a composite layer formed by combination of these layers with such other substances as oxides, or a composite layer formed by combination of these layers with such other substances as other metals.

Among these materials, those which have a high thermal conductivity, e.g., Cu, Al, Au, Cu alloy, Al alloy and Au alloy, give a disk of quenched structure and tend less to give rise to the fluctuation of reflectivity after a large number of times of rewriting. Similar characteristics are also observed with Ag, Ag alloys, and the like. On the other hand, those which have a low thermal conductivity as Sb—Bi, Dy, SUS, Ni—Cr or the like facilitate heat retaining and hence have the advantage of giving a good recording sensitivity.

The use of Mo or Mo compounds, which are low in reactivity, has an advantage in that they are not liable to cause deterioration of layer characteristics as the result of their reaction with the first reflective layer which might be caused by a large number of times of laser irradiation, and hence are not liable to cause deterioration of rewriting characteristics. Similar results are also obtained with W and W compounds.

Au alloys, such as Au—Ag, Au—Co and Au—Al, have the advantage of giving a high adhesive strength and hence are preferably used as compared with elemental Au.

The second reflective layer may also be a layer of such materials as alloys comprising Si, Ge, Sn and In as the main components or alloys of these metals with above-mentioned elements, so long as the materials are different in refractive index and extinction coefficient from the material of the first reflective layer, or it may also be a multilayer formed of these layers, a composite layer of these materials with such other substances as oxides or composite layer of these materials with such other substances as metals. The materials preferably has an extinction coefficient k of not less than 3.

Al—Ti and the materials used in place of Al—Ti, used for the second reflective layer, preferably constitute 80% or more of the total number of atoms of the second reflective layer. When the content of impurities other than the above-mentioned materials is 20 atomic % or more, deterioration of the rewriting characteristic is observed.

(38) Though the read/write characteristics can be improved by selecting the respective, individual preferable ranges with regard to layer thickness and the material of respective layers described above, the improving effects can be further enhanced by proper combination of these respective preferable ranges.

(39) Although the materials described in (2)–(4), (8)–(9) and (36) can be used as the material for the first reflective layer and the materials described in (5)–(9) and (37) for the second reflective layer, the rewriting characteristic can be improved by proper selection of the combination of these materials.

In a representative preferred combination, the first reflective layer consists essentially of at least one member selected from the group consisting of Si, Si—Ti, Si—Mo, Si—Al, Si—Ge and Ge or a composition near thereto and the second reflective layer consists essentially of at least one member selected from the group consisting of Al, al alloys, Au, Au alloys, Ag, Ag alloys, Cu, Cu alloys, Pt, Pt alloys, Mo, Mo compounds and Sb—Bi solid solution or a composition near thereto.

DETAILED DESCRIPTION OF THE PREFERRED EMBODIMENTS

The present invention is described below in detail with reference to Examples.

Example 1

Structure, preparation process

Figure 1:
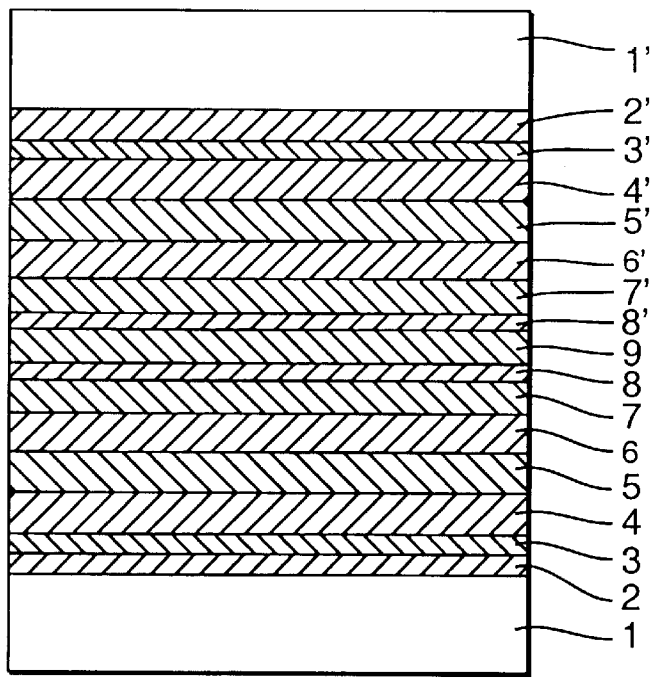
FIG. 1 is a sectional view showing the structure of the information recording medium of Example 1 of the present invention.

FIG. 1 is a sectional view showing the structure of the disk-formed information recording medium of Example 1 of the present invention. This medium was prepared in the following manner.

First, on a polycarbonate substrate 1, 12 cm in diameter, 0.6 mm in thickness and having a continuous groove on the surface was formed a protective layer 2 consisting essentially of a $(ZnS)_{80}(SiO_2)_{20}$ layer in a thickness of about 100 nm. Then, successively thereon, were formed an $Ag_2Ge_{20}Sb_{22}Te_{56}$ recording layer 3 in a thickness of about 20 nm, an intermediate layer 4 consisting essentially of an $Al_2O_3$ layer in a thickness of about 25 nm, the first reflective layer 5 consisting essentially of Si in a thickness of about 80 nm and the second reflective layer 6 consisting essentially of an $Al_{97}Ti_3$ layer in a thickness of about 200 nm. These laminate layers were formed by using a magnetron sputtering apparatus. Thus, the first disk member was obtained.

Separately, in exactly the same manner as above, the second disk member having the same structure as the first disk member was obtained. The second disk member was obtained by laminating on a substrate 12 cm in diameter and 0.6 mm in thickness successively a protective layer 2' consisting essentially of a $(ZnS)_{80}(SiO_2)_{20}$ layer about 100 nm in thickness, a recording layer 3' consisting essentially of an $Ag_2Ge_{20}Sb_2Te_{56}$ layer about 20 nm in thickness, an intermediate layer 4' consisting essentially of an $Al_2O_3$ layer about 25 nm in thickness, the first reflective layer 5' consisting essentially of Si about 80 nm in thickness and the second reflective layer 6' consisting essentially of an $Al_{97}Ti_3$ layer about 200 nm in thickness.

Thereafter, the first disk member and the second disk member were laminated such that their respective second respective layers 6 and 6' faced to each other via an adhesive layer 7, to obtain a diskformed information recording medium shown in FIG. 1.

Figure 2:
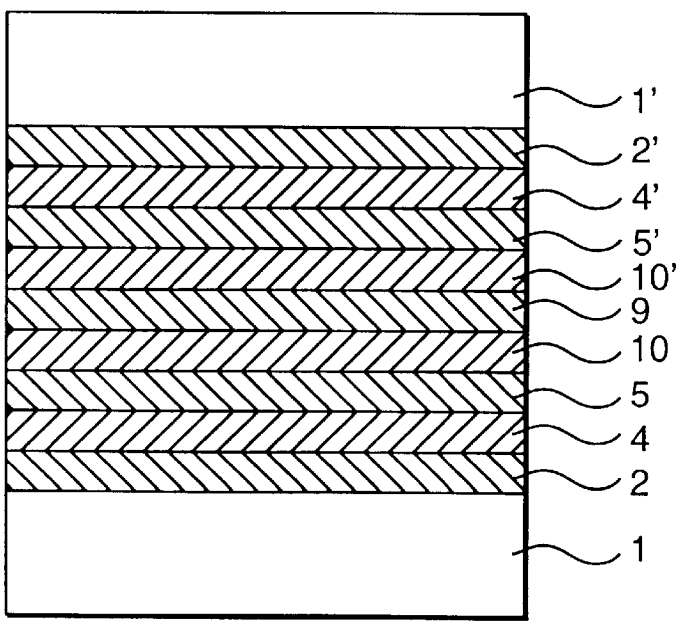
FIG. 2 is a sectional view showing the structure of an information recording medium of a prior structure.

For comparison, a sectional view illustrating the structure of a disk-formed information recording medium of a prior structure is shown in FIG. 2.

The medium was prepared in the same manner as described above except that the layer structure was of a 4-layer structure devoid of the Si layer of the first reflective layer. Thus, on a polycarbonate substrate 1 were successively formed a protective layer 2 consisting essentially of a $(ZnS)_{80}(SiO_2)$ layer in a thickness of about 110 nm, an $Ag_2Ge_{20}Sb_{22}Te_{56}$ recording layer 3 in a thickness of about 20 nm, an intermediate layer 4 consisting essentially of a $(ZnS)_{80}(SiO)_{20}$ layer in a thickness of about 20 nm and a reflective layer 8 consisting essentially of an $Al_{97}Ti_3$ layer in a thickness of about 200 nm. Two disk members prepared in the same manner were laminated to obtain the disk-formed information recording medium shown in FIG. 2.

Initial Crystallization

The recording layers 3 and 3' of the medium prepared as described above were subjected to initial crystallization in the following manner. Since the crystallization procedure is exactly the same also with the recording layer 3', the following description is made only with the recording layer 3.

The medium was rotated such that the linear velocity of the point on the recording track might be 8 m/s, and a semiconductor laser light (wavelength: about 810 nm) whose spot form was an ellipse which was long in the radius direction of the medium was shed through the substrate 1 upon the recording layer 3 at a laser light power of 800 mW. The recording head was driven while conducting automatic focusing so as to bring the focus of the laser light on the recording layer 3. The spot was moved to shift 1/16 by 1/16 of the spot length of the radius direction of the medium. Thus the initial crystallization was conducted. Although the initial crystallization may be conducted only once, when it was repeated three times the increase of noise due to initial crystallization was slightly reduced. The above procedure of the initial crystallization is advantageous in that the crystallization can be conducted at a high speed. The wavelength of the laser used for conducting the initial crystallization is preferably that of the laser used in recording and reading back or wavelength near thereto (not less than 670 nm and not more than 700 nm), because then the necessary laser power can be reduced.

The initial crystallization may also be conducted on a drive provided with a semiconductor laser (wavelength: 680 nm). In this case, the medium was rotated at a linear velocity of 6 m/s, laser light power was kept at a level (about 1 mW) which would effect neither recording nor erasing, and the laser light was converged with a lens of the recording head having a numerical aperture (NA) of 0.6 and shed on the recording layer 3 through the substrate 1. The recording head was driven while conducting tracking by detecting the light reflected from the recording layer 3 and while conducting automatic focusing so as to bring the focus of the laser light on the recording layer 3. The laser light irradiation was conducted with a continuous (DC) laser light on one and the same recording track twice at the level (10 mW) which could effect amorphousization and twice at the level (4 mW) which could effect crystallization. The irradiation time (the time of passage of light spot) at each time of irradiation was about 0.18µ sec. By irradiation of laser lights different in power as described above, the initial crystallization can be thoroughly effected.

The initial crystallization may also be conducted by converging the light of a 3 kW halogen lamp, provided in parallel to a line which passes through the center of a rotating disk, with an ellipsoidal mirror on a mask which is in close vicinity of the rotating disk and has a slit radially opening in the radial direction of the disk, and shedding the light which has passed the slit on the intended layer. The width of the slit is preferably not less than 0.1 mm and not more than 1 mm, and its length preferably extends in proportion to the radius of the nearly disk in the length of the radial direction of the region requiring initial crystallization on the disk. The distance between the disk and the slit is preferably 1 mm or less. This method of initial crystallization is advantageous in that the initial crystallization can be completed by rotating the medium only a small number of times.

Recording, Erasing

Then, information recording was conducted with the seconding laser light power changed between an intermediate power level Pm (5 mM) and a high power level Ph (13 mW) while conducting tracking and automatic focusing on the recording region of the recording layer 3 which had completed the initial crystallization as described above. The linear velocity of the recording track was 6 m/s, the semiconductor laser wavelength 680 nm and the numerical aperture (NA) of the lens 0.6. The amorphous or nearly amorphous parts formed on the recording region by the recording laser light constitute record points.

Figure 3:
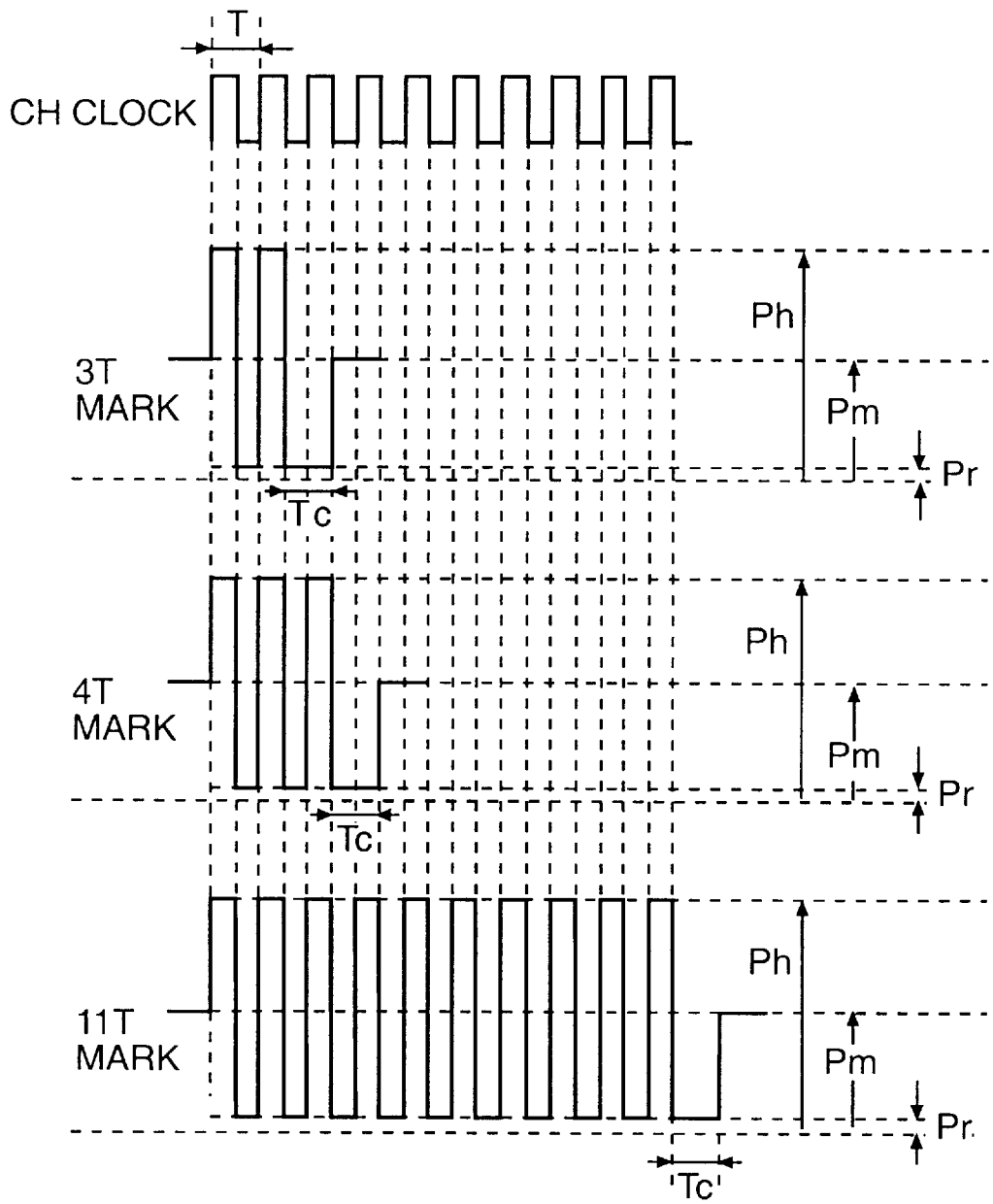
FIG. 3 is a diagram showing the waveform used for evaluation of the read/write characteristics of the information recording medium of the present invention.

The power ratio of the high level to the intermediate level of the recording laser light is particularly preferably in the range from 1:0.3 to 1:0.6. Additionally, another power level may be used each for a short time. Thus, as shown in FIG. 3, when recording and reading back were conducted with an apparatus having a means of (1) repeatedly lowering the light power to a level lower by half the window width (i.e., Tw/2) than the intermediate power level during the time of forming one record mark and (2) generating a record wave form in which the time width Tc of cooling pulse, wherein the power is lowered at the end of the record mark formation, is taken at 1 Tw, the resulting reproduced signal wave form showed a particularly low jitter value and error rate. Though FIG. 3 shows only the record wave forms of 3Tw, 4Tw and 11Tw, actually, in 5Tw–10Tw, before the Tc of the wave form of 4Tw, sets of combined wave forms obtained by keeping the power at a high level and a low level respectively for Tw/2 are successively added one by one. Addition of 7 sets forms 11Tw. The shortest record mark length corresponding to 3Tw was taken at 0.62 µm. When the laser light went past the part to be recorded, the laser light power was lowered to a low power level Pr (1 mW) of the reading-back (reading) laser light.

In the recording method described above, previous information can be rewritten into new information by recording new information by means of overwriting, without applying erasing to the part on which information has previously been recorded. Thus, overwriting can be conducted with a single, approximately round light spot.

However, recording may also be conducted as follows. That is, previously recorded information is once erased by radiating a continuous light of intermediate power level (5 mW) or a level near thereto (6 mW) of the power-modulated recording laser light described above, in the initial one or plural times of rotation of the disk at the time of rewriting, and then, in the next one rotation, radiating a laser light power-modulated according to the information signal between the low power level (1 mW) and the high power level (13 mW) or between the intermediate level (5 mW) and the high power level, to effect recording. When recording is conducted after erasing information as described above, previously written information scarcely remains unerased and a particularly low jitter value is obtained. Accordingly, recording whose shortest record mark length is less than 0.62 µm also can be easily obtained.

These methods are effective not only for the recording layer used in the medium of the present invention but also for recording layers of other media.

Figure 4:
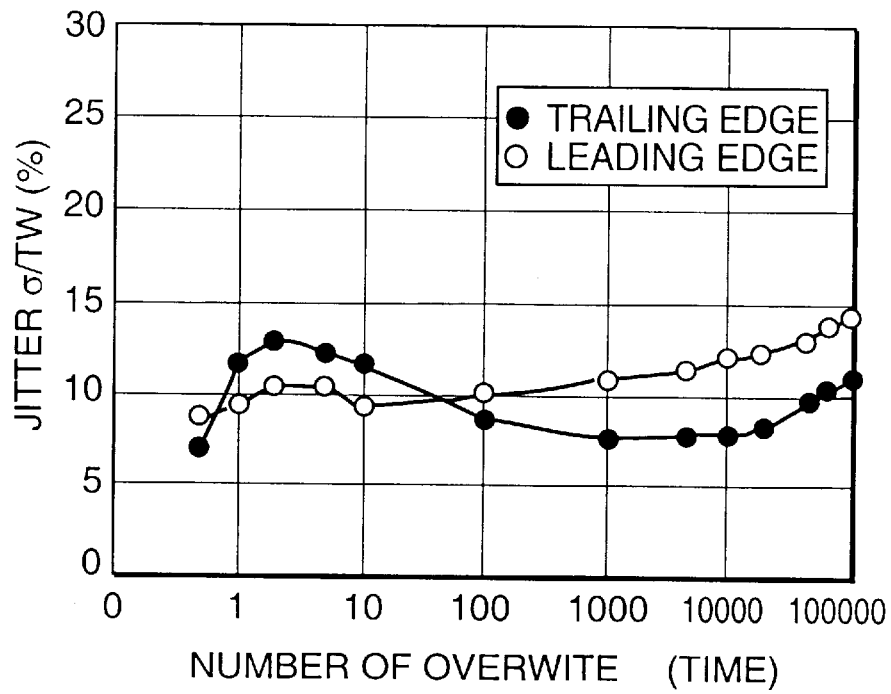
FIGS. 4A and 4B are respectively a graph showing the rewriting characteristics of the information recording medium of Example 1 of the present invention and that of an information recording medium of a prior structure, respectively.
Figure 4:
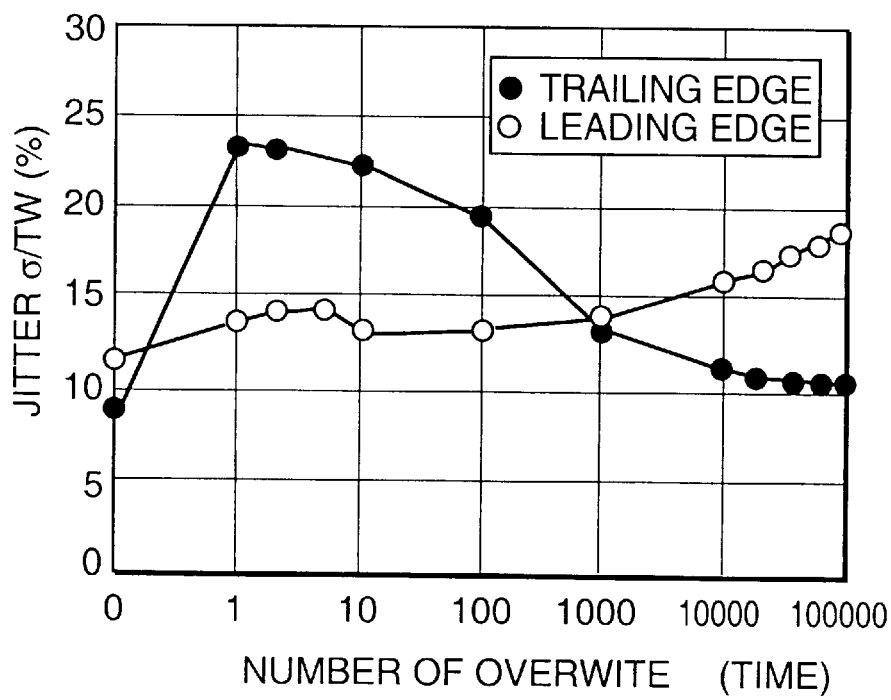

In the information recording medium of the present Example, when recording-erasing was repeated under a severe condition wherein the laser light power was made 15% higher than the optimum value, the jitter ($\sigma$/Tw) at the trailing edge and the jitter at the leading edge could be reduced respectively by about 5% and about 3% in 2–10 times of rewriting than in information recording media of prior structure, as shown in FIG. 4. After $10^5$ times or more of rewriting, also, the jitter at the leading edge could be reduced. In the determination of jitter the window width (Tw) was 34 ns, the shortest record signal was 3 Tw and the longest record signal was 11 Tw, which were all recorded at random. In the above-mentioned determinations, a regenerating-equalizing circuit was not used. When the circuit was used, a jitter reducing effect of an additional 1–3% was observed. Furthermore, the width of the region in which severe distortion of the read signal wave form takes place as the result of the deficiency of the layer material at the record starting part and the accumulation thereof at the ending part which are caused by the flow of the recording layer could be reduced to 15 Byte equivalent or less at the starting part and to 5 Byte equivalent or less at the ending part. In a disk of prior structure, these values were found to be 20 Byte and 30 Byte, respectively.

When the intermediate layer 4 was omitted in the disk of the present Example, the increase of jitter was observed at a number of times of rewriting smaller by one order than that described above. However, the increase of jitter was smaller than in a disk of prior structure from which the intermediate layer had been omitted.

Spectral characteristics of information recording medium

Figure 5:
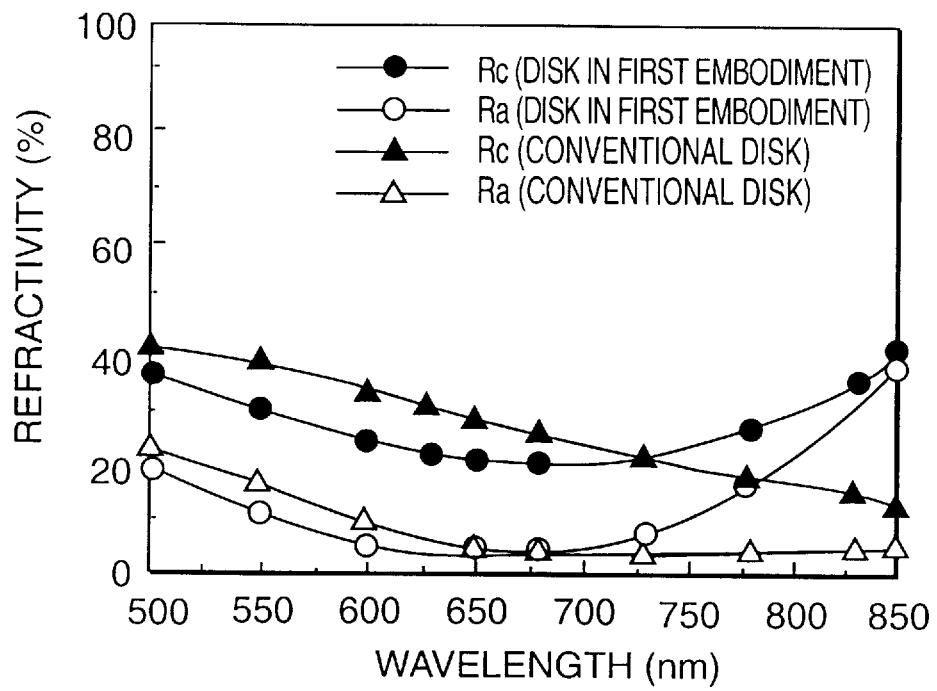
FIG. 5 is a graph showing the wavelength dependency of the reflectivity of the information recording medium of Example 1 of the present invention and that of an information recording medium of a prior structure.

Two test pieces were prepared which were of the same structure as the above-mentioned disk member except that the substrate material was changed to glass to examine their spectral characteristics, (FIG. 5). Thus, on an optically polished glass plate about 1 mm in thickness used as the substrate was formed a protective layer 2 consisting essentially of a $(ZnS)_{80}(SiO_2)_{20}$ layer in a thickness of about 100 nm. Then, successively thereon were formed in the same manner as in the above-mentioned disk member, an $Ag_2Ge_{20}Sb_{22}Te_{56}$ recording layer 3 in a thickness of about 20 nm, an intermediate layer 4 consisting essentially of an $Al_2O_3$ layer in a thickness of about 25 nm, the first reflective layer 5 consisting essentially of Si in a thickness of about 80 nm and the second reflective layer 6 consisting essentially of an $Al_{97}Ti_3$ layer in a thickness of about 200 nm. One of the test pieces thus obtained was kept untreated and the other was heat-treated at 300° C. for 5 minutes. The respective test pieces were irradiated with light from the substrate side and examined for their wavelength dependency of refectivity.

The reflectivity of the heat-treated test piece was indicated as Rc in the Figure and that of the untreated one as Ra. When heat treatment was applied, the same optical characteristics as those obtained when the initial crystallization was conducted by using the ellipsoidal semiconductor laser beam mentioned above were obtained.

Consequently, it was found that in the disk having good rewriting characteristics described in the present Example, the reflectivity has the minimum in the wavelength range of 550 nm–800 nm. At the recording-reading back wavelength, the reflectivity of the untreated test piece (indicated as Ra) was found to be 10% or less and the reflectivity of the heat-treated one (Rc) 15% or more.

With disks of prior structure, test pieces having the same structure as described above except for the substrate were also prepared and subjected to the same determination. Resultantly it was found that both at the as-depo state and at the crystalline state the reflectivity showed no minimum in the wavelength range of 500 nm–850 nm.

When these spectral characteristics are determined with disks, the positions of the minimum and the maximum are sometimes difficult to judge since the wavelength dependency of light absorption of the substrate is observed. Particularly in the wavelength range of 650 nm or less, the reflectivity tends to be indicated as considerably lower values than actual.

Figure 6:
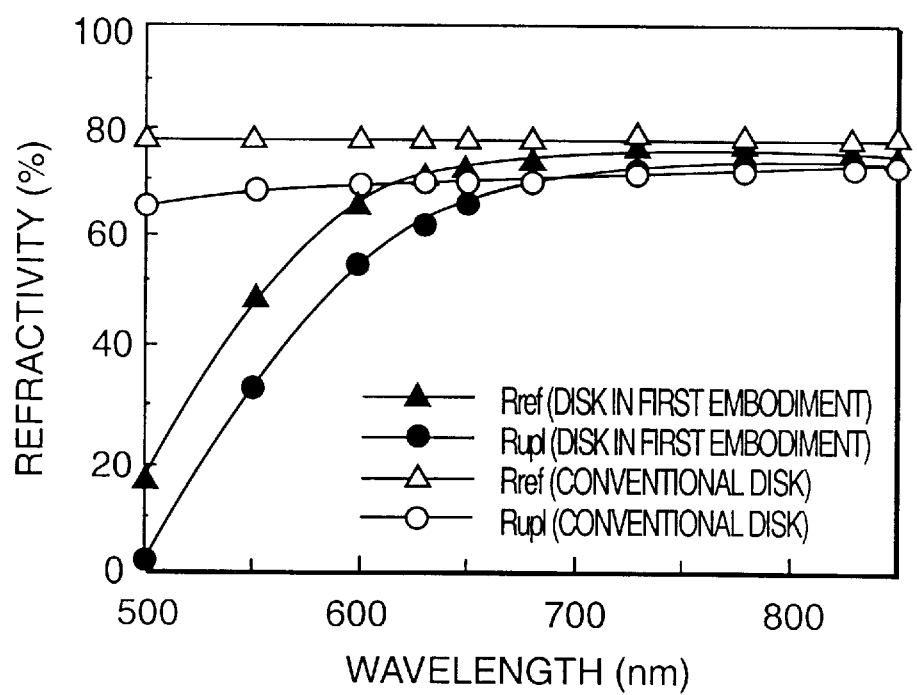
FIG. 6 is a graph showing the wavelength dependency of the reflectivity of the reflective layer and of the intermediate layer and the reflective layer of the information recording medium of Example 1 and that of an information recording medium of a prior structure.

In the disk having good rewriting characteristics described in the present Example, the disk member was peeled apart between the recording layer and the intermediate layer, and reflectivity was determined from the intermediate layer side toward the reflective layer (Rupl). Reflectivity was also determined when the disk member was peeled apart between the intermediate layer and the reflective layer (Rref). As shown in FIG. 6, it was found that the wavelength dependency of reflectivity was large and in the wavelength range of 500 nm–850 nm the difference between the maximum and the minimum values was 20% or more. With a disk in which the difference was still large, the difference was found to be 40% or more.

Upon similar determination made with disks of prior structure, it was found that the difference between the maximum and the minimum values was 5% or less when the disk was peeled apart between the recording layer and the intermediate layer, and the difference was 10% or less when it was peeled apart between the intermediate layer and the reflective layer.

Thus, it was revealed that the spectral characteristics of the disk having good rewriting characteristics described in the present Example were different from those of a disk of the prior structure.

Recording layer material

As to the material of the recording layer to be used in place of $Ag_2Ge_{20}Sb_{22}Te_{56}$ used in recording layers 3,3' in the present Example, those of the Ag—Ge—Sb—Te type different in composition ratio, such as $Ag_5Ge_{20}Sb_{20}Te_{55}$ and $Ag_1Ge_{21}Sb_{23}Te_{55}$, are little liable to show the decrease of possible number of times of rewriting. When the amount of Ag increases, unerased record increases although recording sensitivity improves. When the amount of Ag is decreased, recording sensitivity lowers although erasing characteristic improves. In Ag—Ge—Sb—Te type materials, it was found that those of the composition in the range of 1–5 atomic % of Ag, 17–23 atomic % of Ge, 19–25 atomic % of Sb and 53–59 atomic % of Te are particularly little liable to show the decrease of the possible number of times of rewriting. Further, it was found that materials of a composition consisting essentially of 5–15% of $AgSbTe_2$ or materials near thereto and the remainder of $Ge_2Sb_2Te_5$ or materials near thereto were favorable because they gave a large difference of reflectivity between the crystalline and the amorphous states and gave large reproduced signals.

Secondly, materials of the Cr—Ge—Sb—Te type, Co—Ge—Sb—Te type, V—Ge—Sb—Te type and a similar type, for example $(Cr_4Te_5)_{10}(Ge_2Sb_2Te_5)_{90}$, though showing an increased jitter after 30,000 times or more of rewriting, also gave similar good results in many other characteristic properties.

Further, also when the above-mentioned materials are replaced by at least one such material other than described above as $Ge_2Sb_2Te_5$, $GeSb_2Te_4$, $GeSb_4Te_7$, $In_2SbTe_2$, $In_{35}Sb_{32}Te_{33}$, $In_{31}Sb_{26}Te_{43}$, GeTe, Ag—In—Sb—Te, Ni—Ge—Sb—Te, Pt—Ge—Sb—Te, Si—Ge—Sb—Te, Au—Ge—Sb—Te, Cu—Ge—Sb—Te, Mo—Ge—Sb—Te, Mn—Ge—Sb—Te, Fe—Ge—Sb—Te, Ti—Ge—Sb—Te, Bi—Ge—Sb—Te and a material having a composition near thereto, or when part of Ge is replaced by In, characteristic properties near to those described above can be obtained.

Further, recording layers which comprise a phase-changeable component containing Ge—Sb—Te as the main constituent and a high melting component having a higher melting point tend little to show the decrease of possible number of times of rewriting. The recording layer tends still less to show the decrease of possible number of times of rewriting when 95% or more of the total number of atoms of the phase-changeable component constitute a combination of GeTe and $Sb_2Te_3$ and 95% or more of the total number of atoms of the high melting component constitute at least one composition selected from Cr—Te, Cr—Sb, Cr—Ge, Cr—Sb—Te, Cr—Sb—Ge, Cr—Ge—Te, Co—Te, Co—Sb, Co—Ge, Co—Sb—Te, Co—Sb—Ge, Co—Ge—Te, Cu—Te, Cu—Sb, Cu—Ge, Cu—Sb—Te, Cu—Sb—Ge, Cu—Ge—Te, Mn—Te, Mn—Sb, Mn—Ge, Mn—Sb—Te, Mn—Sb—Ge, Mn—Ge—Te, V—Te, V—Sb, V—Ge, V—Sb—Te, V—Sb—Ge, V—Ge—Te, Ni—Te, Ni—Sb, Ni—Ge, Ni—Sb—Te, Ni—Sb—Ge, Ni—Ge—Te, Mo—Te, Mo—Sb, Mo—Ge, Mo—Sb—Te, Mo—Sb—Ge, Mo—Ge—Te, W—Te, W—Sb, W—Ge, W—Sb—Te, W—Sb—Ge, W—Ge—Te, Ag—Te, Ag—Sb, Ag—Ge, Ag—Sb—Te, Ag—Sb—Ge, and Ag—Ge—Te, and a composition near thereto. It was found that Cr—Te as $Cr_4Te_5$, $Cr_2Te_3$ and $Cr_5Te_8$ gave a particularly low jitter after $10-10^4$ times of rewriting. It was also found that $Ag_2Te$, $AgSbTe_2$ or the like gave a high signal strength even with a light source of shorter wavelength, Ag—Te and Ag—Sb—Te being particularly preferable.

When the composition which constitute 95% or more of the total number of atoms of the phase-changeable component is $Ge_2Sb_2Te_5$, a good rewriting characteristic is obtained when the proportion of the number of atoms of the high melting component to the total number of atoms in the recording layer is not less than 5 atomic % and not more than 20 atomic %. Particularly when the proportion is not less than 5 atomic % and not more than 15 atomic %, a good erasing characteristic and hence a better rewriting characteristic are obtained.

The content of impurity elements in the recording layer is preferably not more than 10 atomic %, more preferably not more than 5 atomic %, based on the recording layer components, because then the deterioration of rewriting characteristic can be reduced.

The recording layer thickness is preferably not less than 15 nm and not more than 40 nm, more preferably not more than 26 nm, because then a high degree of modulation can be obtained and the layer hardly undergoes flowing.

Protective layer, intermediate layer, substrate material, etc.

Whereas the protective layer 2 is formed with $(ZnS)_{80}(SiO_2)_{20}$ in the present Example, the layer material may, in place of the above-mentioned material, although giving somewhat inferior recording sensitivity and jitter, be materials obtained by changing the mixing ratio of ZnS and $SiO_2$ thereof; Si—N type materials; Si—O—N type materials; oxides, such as $SiO_2$, SiO, $TiO_2$, $Al_2O_3$, $Y_2O_3$, CeO, $La_2O_3$, $In_2O_3$, GeO, $GeO_2$, PbO, SnO, $SnO_2$, $Bi_2O_3$, $TeO_2$, $WO_2$, $WO_3$, $Sc_2O_3$, $Ta_2O_5$ and $ZrO_2$; nitrides, such as TaN, AlN, $Si_3N_4$, and Al—Si—N type materials (e.g., $AlSiN_2$); sulfides, such as ZnS, $Sb_2S_3$, CdS, $In_2S_3$, $Ga_2S_3$, GeS, $SnS_2$, PbS and $Bi_2S_3$; selenides, such as $SnSe_2$, $Sb_2Se_3$, CdSe, ZnSe, $In_2Se_3$, $Ga_2Se_3$, GeSe, $GeSe_2$, SnSe, PbSe and $Bi_2Se_3$; fluorides, such as $CeF_3$, $MgF_2$ and $CaF_2$; Si, Ge, $TiB_2$, $B_4C$, B, and C; and materials having a composition near to those described above. The protective layer may also be a layer of a mixture of these materials, or the multilayer thereof.

The protective layer 2 may also be prepared by first forming the protective layer material 1 nm or more thicker than ultimately intended and then conducting sputtering in the reverse direction, that is, in the direction in which the substrate material side is etched thereby etching the protective layer material which has been deposited thicker, to obtain a proper layer thickness. Though this method requires extra time for preparation, it has an advantage in that the protective layer surface can be made more smooth and resultantly the disk noise can be decreased.

The thickness of the protective layer is preferably not less than 80 nm and not more than 110 nm,. because the degree of modulation can be increased and the increase of jitter in a large number of times of rewriting is small.

Though the intermediate layer 4 is formed with $Al_2O_3$ in the present Example, similar good results are obtained when Al oxides wherein the composition ratio of Al to O deviates from 2 to 3 are used in place thereof. Further, the material of the layer may be, although giving somewhat inferior jitter, $(ZnS)_{80}(SiO_2)_{20}$, materials obtained by changing the mixing ratio of ZnS and $SiO_2$ thereof, Si—N type materials, Si—O—N type materials; oxides, such as $SiO_2$, SiO, $TiO_2$, $Al_2O_3$, $Y_2O_3$, CeO, $La_2O_3$, $In_2O_3$, GeO, $GeO_2$, PbO, SnO, $SnO_2$, $Bi_2O_3$, $TeO_2$, $WO_2$, $WO_3$, $Sc_2O_3$, $Ta_2O_5$, and $ZrO_2$; nitrides, such as TaN, AlN, $Si_3N_4$, and Al—Si—N type materials (e.g., $AlSiN_2$); sulfides, such as ZnS, $Sb_2S_3$, CdS, $In_2S_3$, $Ga_2S_3$, GeS, $SnS_2$, PbS, and $Bi_2S_3$; selenides, such as $SnSe_2$, $Sb_2Se_3$, CdSe, ZnSe, $In_2Se_3$, $Ga_2Se_3$, GeSe, $GeSe_2$, SnSe, PbSe and $Bi_2Se_3$; fluorides, such as $CeF_3$, $MgF_2$ and $CaF_2$; Si, Ge, $TiB_2$, $B_4C$, B and C; or materials having a composition near to those described above. The protective layer may also be a layer of a mixture of these materials and the multilayer thereof. With regard to the elemental ratio in these compounds, for example, the ratio of metallic element to oxygen or the ratio of metallic element to sulfur in oxides and sulfides, it is preferably 2:3 for $Al_2O_3$, $Y_2O_3$ and $La_2O_3$, 1:2 for $SiO_2$, $ZrO_2$ and $GeO_2$, 2:5 for $Ta_2O_5$ and 1:1 for ZnS, or respectively a ratio near to that described above, but similar effects can be obtained even when the ratio deviates from the above values.

The thickness of the intermediate layer is preferably 40 nm or less. It may be 0 nm, in other words, the intermediate layer may be omitted. Since the number of layers is reduced by one in this case, the preparation of the information recording medium is facilitated. To suppress the flow of the recording layer, the layer thickness is preferably 40 nm or less. In the structures given in Examples 1–5, in particular, the intermediate layer thickness is preferably 15–30 nm to obtain still better read/write characteristics.

Though a polycarbonate substrate 1 having a continuous groove directly on the surface is used in the present Example, there may be used, in place thereof, a chemically reinforced glass plate which has a polyolefin, epoxy resin, acrylic resin or ultravioletcurable resin layer formed on the surface. The substrate may be not only a substrate of continuous groove servo format but also a substrate of sample servo format and a substrate based on other format. It may also be a substrate having a format which permits recording and reading back both on the groove part and on the land part. The disk size is not limited to 12 cm but may be other sizes, e.g., 13 cm, 3.5' and 2.5'. The disk thickness also is not limited to 0.6 mm but may also be other thickness, e.g., 1.2 mm and 0.8 mm.

Similar characteristic properties can also be obtained when, in the present Example, the intermediate layers 4 and 4' are omitted and the first reflective layers 5 and 5' are directly formed on the recording layers 3 and 3'. Since the number of layers is reduced by one in this case, the disk can be prepared easily and in a shorter time.

In the present Example, two disk members are prepared by exactly the same method and the second reflective layers 6 and 6' of the first and the second disk members prepared above are laminated on each other via an adhesive layer. However, a disk member of other structure or a substrate for protection may also be used in place of the second disk member. When the disk member or the substrate for protection used in the lamination has a high transmittance in the ultraviolet wavelength region, the lamination can also be effected with ultraviolet-curable resin. Other methods of lamination may also be used.

In the present Example, two disk members are prepared and the second reflective layers 6 and 6' of the first and the second disk members prepared above are laminated on each other via an adhesive layer. However, when ultraviolet-curable resin is coated in about 10 $\mu$m thickness on the second reflective layers 6 and 6' of the first and the second disk members before the lamination, then cured and thereafter the lamination is conducted, the error rate can be still more reduced.

First reflective layer of materials other than Si

When, in place of Si used for the first reflective layer 5 in the present Example, Si containing Au, Ag, Cu, Al, Ni, Fe, Co, Cr, Ti, Pd, Pt, W, Ta, Mo, Sb, Bi, Dy, Cd, Mn, Mg, V, Zn, Ga, Tl, PB, C, B or S added thereto is used as the first reflective layer material, the transmittance of the reflective layer decreases, its absorptivity increases and consequently the lowering of sensitivity can be prevented. The content of the added element in this case is preferably not less than 1 atomic % and not more than 25 atomic %, because then the layer tends less to show the fluctuation of reflectivity level in a large member of times of rewriting.

When a Si—Ge mixed material is used as the reflective layer material, the light absorptivity of the record mark part can be made smaller than that of the parts other than the record mark part, hence incomplete erasing due to light absorptivity difference can be prevented and the recording layer tends still less to show the decrease of possible number of times of rewriting. The content of Ge is preferably not less than 10 atomic % and not more than 80 atomic %, because then the resulting medium tends less to show the decrease of possible number of times of rewriting.

Similar good results are obtained when the material for the first reflective layer is a Si—N, Si—Sn or Si—In mixed material or the mixture of two or more of these mixed materials. These reflective layer materials, not only when used together with the phase-changeable layer of the present invention, but also when employed as the reflective layer material used with other phase-changeable layer, give rise to less decrease of the possible number of times of rewriting than previous reflective layer materials. The content of the element added to Si is preferably not less than 3 atomic % and not more than 50 atomic % to suppress the decrease of possible number of times of rewriting.

Further, the first reflective layer may be a layer formed of a mixed material containing Si and Ge other than those described above, a layer comprising a material having a high refractive index and low extinction coefficient, a multilayer formed of such layers, and a composite layer formed by combination of such layers with a layer of other substances, such as oxides. There can also be used for the layer Ge, various nitrides, sulfides and selenides.

Further, materials other than those described above which have a refractive index of 3 or more and an extinction coefficient of 2 or less at the recording wavelength or the reading back wavelength can also be used.

Si and the materials used in place of Si, used for the first reflective layer, preferably constitute 90% or more of the total number of atoms of the first respective layer. When the content of impurities other than the above-mentioned materials is 10 atomic % or more, deterioration of the rewriting characteristic was observed.

The thickness of the first reflective layer is preferably 60 nm–90 nm to obtain good read/write characteristics.

Second reflective layer

The materials preferably used for the second reflective layer in place of Al—Ti employed for the second reflective layer 6 in the present Example are those comprising as the main component Al alloys, such as Al—Ti, Al—Ag, Al—Cu and Al—Cr.

In the case of Al alloys, the content of Al is preferably not less than 50 atomic % and not more than 99.9 atomic % to increase the thermal conductivity and suppress the decrease of possible number of times of rewriting.

The reflective layer may also use a layer of an Al alloy other those described above, or such single elements as Au, Ag, Cu, Al, Ni, Fe, Co, Cr, Ti, Pd, Pt, W, Ta, Mo, Sb, Bi, Dy, Cd, Mn, Mg and V, or alloys containing these elements as the main component, such as Au alloy, Ag alloy, Cu alloy, Pd alloy, Pt alloy, Sb—Bi, SUS, and Ni—Cr, or alloys of these elements with each other; or it may be a multilayer consisting essentially of these layers, a composite layer formed by combination of these layers with such other substances as other metals.

Among these materials, those which have a high thermal conductivity, e.g., Cu, Al, Au, Cu alloy, Al alloy and Au alloy, give a disk of quenched structure and tend less to give rise to the fluctuation of reflectivity after a large number of times of rewriting. Similar characteristics are also observed with Ag, Ag alloys and the like. On the other hand, those with a low thermal conductivity, such as Sb—Bi, Dy, SUS, Ni—Cr or the like, facilitate heat retaining and hence have the advantage of giving a good recording sensitivity.

The use of Mo or Mo compounds, which are low in reactivity, has an advantage in that they are not liable to cause deterioration of layer characteristics as the result of their reaction with the first reflective layer which might be caused by a large number of times of laser irradiation, and hence are not liable to cause deterioration of rewriting characteristic. Similar results were also obtained with W and W compounds.

Au alloys, such as Au—Ag, Au—Co and Au—Al, have the advantage of giving a high adhesive strength as compared with elemental Au.

The second reflective layer may also be a layer of such materials as alloys comprising Si, Ge, Sn and In as the main component or alloys of these metals with above-mentioned elements, so long as the materials are different in reflective index and extinction coefficient from the material of the first reflective layer; or it may also be a multilayer formed of these layers, a composite layer of these materials with such other substances as oxides or a composite layer of these materials with such other substances as metals. The material preferably has an extinction coefficient K of not less than 3.

Al—Ti and the materials used in place of Al—Ti, employed for the second reflective layer material, preferably constitute 80% or more of the total number of atoms of the second reflective layer. When the content of impurities other than the above-mentioned materials is 20 atomic % or more, deterioration of the rewriting characteristic was observed.

The thickness of the second reflective layer is preferably not less than 50 nm to increase strength and thermal diffusion and not more than 350 nm to reduce the time necessary for preparation. More preferably it is 150 nm–250 nm.

Layer thickness and material of respective layers

Though the read/write characteristics can be improved by selecting the respective, individual preferable ranges with regard to the layer thickness and the material of respective layers, the improving effects can be further enhanced by proper combination of these respective preferable ranges.

Combination of first reflective layer material and second reflective layer material Although the materials described in Example 1 can be used as the first reflective layer material and those described in Example 1 and the present Example can be used as the second reflective layer material, it was found that the rewriting characteristic could be improved by proper selection of the combination of these materials. In a representative preferred combination, the first reflective layer consists essentially of at least one member selected from the group consisting of Si, Si—Ti, Si—Mo, Si—Al, Si—Ge and Ge or a composition near thereto and the second reflective layer consists essentially of at least one member selected from the group consisting of Al, Al alloys, Au, Au alloys, Ag, Ag alloys, Cu, Cu alloys, Pt, Pt alloys, Mo, Mo compounds and Sb—Bi solid solution or a composition near thereto.

Example 2

Structure, preparation process

The following information recording medium was prepared in the same manner as in Example 1 except that Si used in the first respective layer 5 of Example 1 was changed to Si—Ti. Thus, to prepare the information recording medium of Example 2, on a polycarbonate substrate 1 12 cm in diameter, 0.6 mm in thickness and having a continuous groove on the surface were successively laminated a protective layer 2 consisting essentially of a $(ZnS)_{80}(SiO_2)_{20}$ layer of a thickness of about 100 nm, a recording layer 3 consisting essentially of an $Ag_2Ge_{20}Sb_{22}Te_{56}$ layer of a thickness of about 20 nm, an intermediate layer 4 consisting essentially of an $Al_2O_3$ layer of a thickness of about 25 nm, the first reflective layer 5 consisting essentially of $Si_{95}Ti_5$ of a thickness of about 80 nm and the second reflective layer consisting essentially of an $Al_{97}Ti_3$ layer of a thickness of about 200 nm. Thus, a disk member was obtained. The second reflective layers 6 and 6' of the first disk member and the second disk member prepared by exactly the same method described above were laminated on each other to obtain a disk-formed information recording medium.

The disk-formed information recording medium of prior structure used for comparison in the present Example was the same as used in Example 1. The methods used for recording and reading back information were also the same as in Example 1.

Initial crystallization

The method used for initial crystallization was also the same as in Example 1. The information recording medium of Example 2 has a high reflectivity (Ra) over a wider range than the information recording medium of Example 1 shown in FIG. 1, so that the former medium shows a wider laser wavelength range in which initial crystallization can be effected with a low laser power. It was found that, in an initial crystallization apparatus provided with a light source having a wavelength (e.g., about 810 nm) distant from the wavelength (630–680 nm) of the laser used in recording and reading back, the power necessary for initial crystallization can be reduced by 10% or more.

Read/write characteristic

The read/write characteristics of the disk were examined by the same methods as in Example 1. Resultantly, it was found that the disk of the present Example, similarly to the disk of Example 1, had the advantage of giving a lower jitter value and smaller width of the region wherein severe distortion of the reading signal wave form takes place, as compared with a disk of prior structure. Spectral characteristic of information recording medium.

Figure 7:
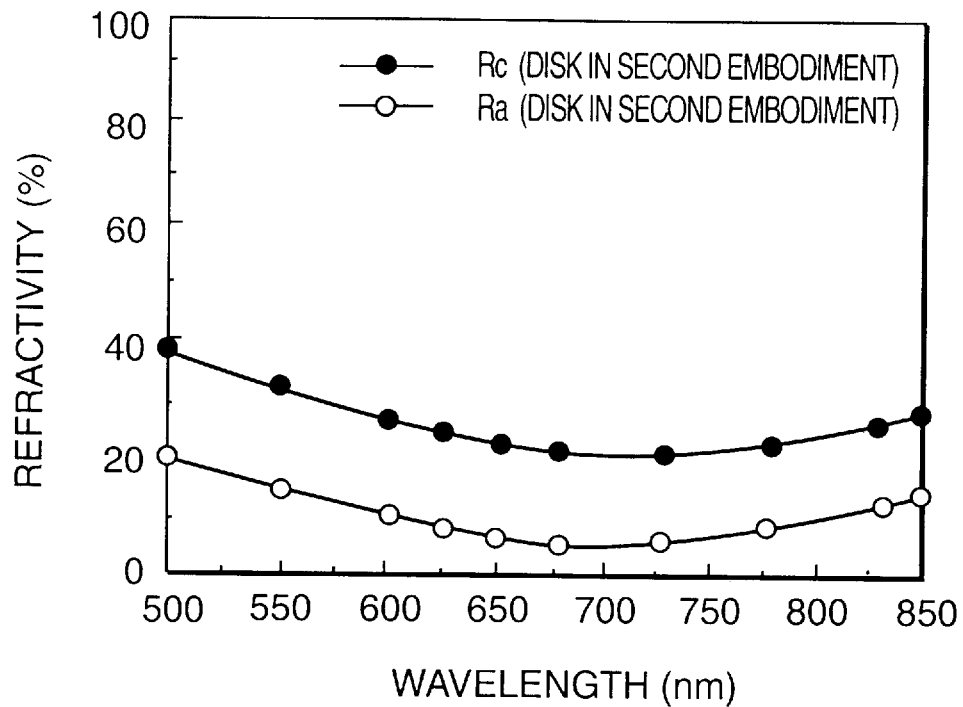
FIG. 7 is a graph showing the wavelength dependency of the reflectivity of the information recording medium of Example 2 of the present invention.

Two test pieces were prepared which were of the same structure as the above-mentioned disk member except that the substrate material was changed to glass, to examine the spectral characteristics (FIG. 7). Thus, on an optically polished glass plate about 1 mm in thickness, used as the substrate, was formed a protective layer 2 consisting essentially of a $(ZnS)_{80}(SiO_2)_{20}$ layer in a thickness of about 100 nm. Then, successively thereon, were formed in the same manner as in the above-mentioned disk member an $Ag_2Ge_{20}Sb_{22}Te_{56}$ recording layer 3 in a thickness of about 20 nm, an intermediate layer 4 consisting essentially of an $Al_2O_3$ layer in a thickness of about 25 nm, the first reflective layer 5 consisting essentially of $Si_{95}Ti_5$ in a thickness of about 80 nm and the second reflective layer 6 consisting essentially of an $Al_{97}Ti_2$ layer in a thickness of about 200 nm. One of the test pieces thus obtained was kept untreated and the other was heat-treated at 300° C. for 5 minutes. The respective test pieces were irradiated with light from the substrate side and examined for their wavelength dependency of reflectivity. The reflectivity of the heat-treated test piece was indicated as Rc and that of the untreated one as Ra. When heat treatment was applied, the same optical characteristics as those obtained when the initial crystallization was conducted are obtained.

Consequently, it was found that in the disk having good rewriting characteristics described in the present Example, the reflectivity has the minimum in the wavelength range of 550 nm–800 nm. At the recording-reading back wavelength, the reflectivity of the untreated test piece (indicated as Ra) was found to be 10% or less and the reflectivity of the heat-treated one (Rc) to be 15% or more.

Figure 8:
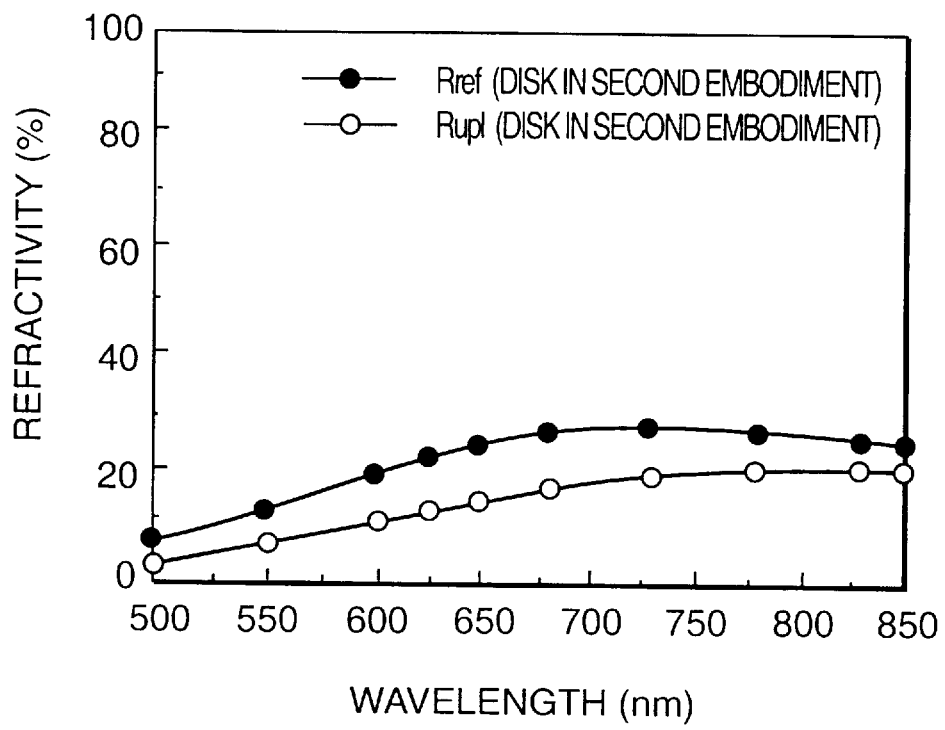
FIG. 8 is a graph showing the wavelength dependency of the reflectivity of the reflective layer and of the intermediate layer and the reflective layer of the information recording medium of Example 2 of the present invention and that of an information recording medium of a prior structure.

In the disk having good rewriting characteristics described in the present Example, the disk member was peeled apart between the recording layer and the intermediate layer and reflectivity was determined from the intermediate layer side toward the reflective layer (Rupl). Reflecting was also determined when the disk member was peeled apart between the intermediate layer and the reflective layer (Rref). It was found that, as shown in FIG. 8, a wavelength dependency of reflectivity was observed and the reflectivity had the maximum value in the wavelength range of 500 nm–850 nm. When the disk member was peeled apart between the recording layer and the intermediate layer and reflectivity was determined from the intermediate layer side toward the reflective layer, sometimes the maximum value was difficult to discern. In such a case, the results of determination obtained when the disk member was peeled apart between the intermediate layer and the reflective layer were referred to.

The results of determination made with a disk of prior structure are as described in Example 1. Thus, it was revealed that the spectral characteristics of the disk having good rewriting characteristics described in the present example were different from those of a disk of prior structure.

First reflective layer of material other than Si and Si—Ti

When, in place of Si used for the first reflective layer 5 in the present Example, Si containing Au, Ag, Cu, Al, Ni, Fe, Co, Cr, Ti, Pd, Pt, W, Ta, Mo, Sb, Bi, Dy, Cd, Mn, Mg, V, Zn, Ga, Tl, Pb, C, B or S added thereto is used as the first reflective layer material, the transmittance of the reflective layer decreases, its absorptivity increases, and consequently the lowering of sensitivity can be prevented. The content of the added element in this case is preferably not less than 1 atomic % and not more than 25 atomic %, because then the layer tends less to show the fluctuation of reflectivity level in a large number of times of rewriting.

Among the above-mentioned Si containing other elements, Si—Ti used in the present Example, Si—Mo and Si—Al are more preferred because they can increase the thermal conductivity of the first reflective layer and can give optical constants of suitable values to the layer. The amount of the element to be added to Si was found to be preferably 2–10 atomic %, more preferably 3–6 atomic %.

As can be seen from the spectral characteristics shown in FIG. 6, the addition of the element causes the decrease of the change of reflectivity with wavelength. As the result, the sensitivity to the initial crystallization power can be more enhanced even when the wavelength of the initial crystallization apparatus is different from the recording-reading back wavelength. Similarly, also when the recording wavelength is different from the reading back wavelength, the recording power or the reading back power can be favorably decreased with ease.

The first reflective layer of the present Example, also when used in the absence of the second reflective layer, gives effects similar to those described above as compared with a layer of Si alone, although the layer thickness naturally needs to be changed so as to attain a high degree of modulation of record signals.

Intermediate layer

The information recording medium of the present Example, even when applied to a case wherein the intermediate layer material is a material other than $Al_2O_3$, for example a material comprising ZnS as the main component, e.g., $(ZnS)_{80}(SiO_2)_{20}$, or a material comprising $SiO_2$ as the main component, produces effects similar to those described above. In such a case, however, the effect of suppressing the change of reflectivity and the increase of jitter in $10^5$ times of rewriting, which is an effect possessed by an intermediate layer of $Al_2O_3$, is small.

As to items not described in the present Example, the same applies as in Example 1.

Example 3

Structure, preparation process

The following information recording medium was prepared in the same manner as in Example 1 except that Si used in the first reflective layer 5 of Example 1 was changed to Si—Ge and the first reflective layer thickness and the second reflective layer thickness were altered. Thus, to prepare the information recording medium of Example 3, on a polycarbonate substrate 1 of 12 cm in diameter, 0.6 mm in thickness and having a continuous groove on the surface were successively laminated a protective layer 2 consisting essentially of a $(ZnS)_{80}(SiO_2)_{20}$ layer of a thickness of about 100 nm, a recording layer 3 consisting essentially of an $Ag_2Ge_{20}Sb_{22}Te_{56}$ layer of a thickness of about 20 nm, an intermediate layer 4 consisting essentially of an $Al_2O_3$ layer of a thickness of about 25 nm, the first reflective layer 5 consisting essentially of a $Si_{70}Ge_{30}$ layer of a thickness of about 80 nm and the second reflective layer 6 consisting essentially of an $Al_{97}Ti_3$ layer of a thickness of about 200 nm. Thus, a disk member was obtained. The second reflective layers 6 and 6' of the first disk member and the second disk member prepared by exactly the same method described above were laminated on each other to obtain a disk-formed information recording medium.

The disk-formed information recording medium of prior structure used for comparison in the present Example was the same as used in Example 1. The methods used for information recording and reading back were also the same as in Example 1.

Initial crystallization

The method used for initial crystallization was also the same as in Example 1. It was found that, in the information recording medium of Example 3, since the thermal conductivity of the first reflective layer was low as compared with that of Example 1, the sensitivity of initial crystallization power was improved by about 10% or more.

Read/write characteristics

Upon examining the read/write characteristics by the same method as in Example 1, it was found that, as in Example 1, the jitter value was low as compared with a disk of prior structure.

Spectral characteristic of information recording medium

The spectral characteristics were examined by the same method as in Example 1. It was found that, as in Example 1, in the test piece having the same structure except for the substrate had the minimum value of reflectivity in the wavelength range of 550 nm–800 nm. At the recording-reading back wavelength the reflectivity was 10% or less at the untreated state and 15% or more at the heat-treated state.

In the disk having good rewriting characteristics described in the present Example, the disk member was peeled apart between the recording layer and the intermediate layer and reflectivity was determined from the intermediate layer side toward the reflective layer. The determination was also made when the disk member was peeled apart between the intermediate layer and the reflective layer. As in Example 1, the wavelength dependency of reflectivity was observed and the reflectivity showed the maximum in the wavelength range of 500 nm–850 nm. When the disk member was peeled apart between the recording layer and the intermediate layer and reflectivity was determined from the intermediate layer side toward the reflective layer, sometimes the maximum value was difficult to discern. In such a case, the results of determination obtained when the disk member was peeled apart between the intermediate layer and the reflective layer were referred to.

The results of determination made with a disk of prior structure are as described in Example 1. Thus, it was revealed that the spectral characteristics of the disk having good rewriting characteristics described in the present Example were different from those of a disk of prior structure.

First reflective layer

The Si—Ge type material used for the first reflective layer 5 in the present Example can make the light absorptivity of the record mark part lower than that of parts other than the record mark, so that it can prevent incomplete erasing due to light absorptivity difference and further it does not cause the decrease of possible number of times of rewriting. Materials usable for the first reflective layer in place of the above-mentioned material are preferably Si—Ge mixed materials having a composition different from the above-mentioned material. Materials with a Ge content of not less than 10 atomic % and not more than 80 atomic % are preferred because they tend less to cause the decrease of possible number of times of rewriting.

When the material contains 80 atomic % or more of Ge, the possible number of times of rewriting is smaller than when Si is used, but in other respects the material exerts similar effects to Si and hence is usable.

As the first reflective layer material, there may be used, besides those described above, sulfides, such as Cd—S and In—Se, and selenides, such as Zn—Se, Cd—Se and In—Se. The materials preferably have a refractive index of 3 or more. However, since they have a low thermal conductivity, they cause a considerable increase of jitter in $10^5$ times of rewriting. Sulfides and selenides may also be used when the disk has the first reflective layer alone and has no second reflective layer.

With regard to items not described in the present Example, the same applies as in Examples 1 and 2.

The first reflective layer material of the present Example exerts the same effects as described above also when the material of the intermediate layer of the recording medium of Example 1 is other than $Al_2O_3$, for example, a material comprising ZnS as the main component, e.g., $(ZnS)_{80}(SiO_2)_{20}$ or a material comprising $SiO_2$ as the main component, provided that they show only weakly the effect of suppressing the reflectivity change and the jitter increase in $10^5$ times of rewriting, which is an effect possessed by the $Al_2O_3$ layer of the intermediate layer.

The first reflective layer of the present Example, also when used in the absence of the second reflective layer, gives effects similar to those described above although the layer thickness naturally needs to be changed so as to attain a high degree of modulation of record signals.

Example 4

Structure, preparation process

The following information recording medium was prepared in the same manner as in Example 1 except that in the protective layer 2 of Example 1 a part of the recording layer side of $(ZnS)_{80}(SiO_2)_{20}$ was changed to $Al_2O_3$. Thus, to prepare the information recording medium of Example 4, on a polycarbonate substrate 1 12 cm in diameter, 0.6 mm in thickness and having a continuous groove on the surface were successively laminated a protective layer 2 consisting essentially of a $(ZnS)_{80}(SiO_2)$ layer about 95 nm in thickness and an $Al_2O_3$ layer about 5 nm in thickness, a recording layer 3 consisting essentially of an $Ag_2Ge_{20}Sb_{22}Te_{56}$ layer about 20 nm in thickness, an intermediate layer 4 consisting essentially of an $Al_2O_3$ layer about 25 nm in thickness, the first reflective layer 5 consisting essentially of Si about 80 nm in thickness and the second reflective layer 6 consisting essentially of an $Al_{97}Ti_3$ layer about 200 nm in thickness. Thus, a disk member was obtained. The second reflective layers 6 and 6' of the first disk member and the second disk member prepared in exactly the same method described above were laminated on each other to obtain a disk-formed information recording medium.

Read/write characteristics

The read/write characteristics were examined by the same method as in Example 1. It was found that, in the disk of the present Example, the change of reflectivity which arises after $10^5$ times of rewriting decreased by 5% as compared with the disk wherein the protective layer material was $(ZnS)_{80}(SiO_2)$, but the recording sensitivity decreased by about 5%.

Protective material, etc.

In the present Example, the protective layer 2 is formed with $(ZnS)_{80}(SiO_2)_{20}$ and $Al_2O_3$. Materials which can be used in place of $Al_2O_3$ are preferably $SiO_2$, mixed materials of $Al_2O_3$ and $SiO_2$ or mixed materials of $Al_2O_3$ and ZnS, and secondly $Ta_2O_5$ and $(ZrO_2)_{97}(Y_2O_3)_3$. Further, $La_2O_3$ and $GeO_2$ may also be used. With regard to the elemental ratio in these compounds, for example, the ratio of metallic element to oxygen or the ratio of metallic element to sulfur in oxides and sulfides, it is preferably 2:3 for $Al_2O_3$, $Y_2O_3$ and $La_2O_3$, 1:2 for $SiO_2$, $ZrO_2$ and $GeO_2$, 2:5 for $Ta_2O_5$ and 1:1 for ZnS, or respectively a ratio near to that described above; but similar effects can be obtained even when the ratio deviates from the above values.

In the case of such a protective layer, the thickness of the $Al_2O_3$ layer or a layer used in place thereof is preferably 2–50 nm, more preferably not less than 3 nm and not more than 20 nm because a recording power of a suitable value can be adopted. The thickness of the protective layer as a whole is preferably 80–110 nm because a high degree of modulation can be adopted at the time of recording.

The protective layer material of the present Example, even when the intermediate layer of the recording medium of Example 1 is a material other than $Al_2O_3$, for example, a material comprising ZnS as the main component, e.g., $(ZnS)_{80}(SiO_2)_{20}$, or a material comprising $SiO_2$ as the main component, gives similar results to those described above. However, the effect of suppressing the increase of jitter in $10^5$ times of rewriting, which is an effect possessed by the $Al_2O_3$ layer of intermediate layer, is small.

When the first reflective layer shown in Examples 2 and 3 and the protective layer of the present Example are used in combination, the effects of the both layers are observed.

Not only in the disk of the structure shown in the present invention but also in a disk of prior structure or a phase-change disk additionally having protective layers, when an $Al_2O_3$ layer is provided to a part of the protective layer material, the effect of decreasing the change of reflectivity which arises in a large number of times of rewriting can be observed. However, the effect of suppressing the increase of jitter in $10^5$ times of rewriting is small.

The protective layer of the present Example, also when used in a disk in which the second reflective layer is absent, gives effects similar to the above, although the thickness of the first reflective layer naturally needs to be changed so as to give a high degree of modulation of reproduced signals.

As to items not described in the present Example, the same applies as in Examples 1–3.

Example 5

Structure, preparation process

The following information recording medium was prepared in the same manner as in Example 1 except that $(ZnS)_{80}(SiO_2)_{20}$ used in the protective layer 2 of Example 1 was changed to $(ZnS)_{70}(SiO_2)_{30}$. Thus, to prepare the information recording medium of Example 5, on a polycarbonate substrate 1 12 cm in diameter, 0.6 mm in thickness and having a continuous groove on the surface were successively laminated a protective layer 2 consisting essentially of a $(ZnS)_{70}(Al_2O_3)_{30}$ layer of a thickness of about 100 nm, a recording layer 3 consisting essentially of an $Ag_2Ge_{20}Sb_{22}Te_{56}$ layer of a thickness of about 20 nm, an intermediate layer 4 consisting essentially of an $Al_2O_3$ layer of a thickness of about 25 nm, the first reflective layer 5 consisting essentially Si of a thickness of about 80 nm and the second reflective layer 6 consisting essentially of an $Al_{97}Ti_3$ layer of a thickness of about 200 nm. Thus, a disk member was prepared. The second reflective layers 6 and 6' of the first and the second disk members thus prepared by exactly the same method were laminated on each other to obtain a disk-formed information recording medium.

The read/write characteristics were examined in the same manner as in Example 1. It was found that, in the disk of the present Example, the change of reflectivity which arises after $10^5$ times of rewriting can be reduced to about ¾ as compared with a disk in which the protective layer material is $(ZnS)_{80}(SiO_2)_{20}$. Further, the disk of the present Example has an advantage in that the decrease of recording sensitivity as observed in the disk of Example 4 is very slight.

Protective layer material, etc.

In the present Example, the protective layer 2 is formed with $(ZnS)_{70}(Al_2O_3)_{30}$. Materials which can be used in place thereof are preferably a mixed material of $Al_2O_3$ and $SiO_2$ and a mixed material of $Al_2O_3$ and $SiO_2$ and ZnS, and secondly materials obtained by replacing a part or the whole of the above-mentioned materials with $Ta_2O_5$ or $(ZrO_2)_{97}(Y_2O_3)_3$. Materials obtained by replacing a part or the whole of the above-mentioned materials with $La_2O_3$ or $GeO_2$ may also be used. The content of impurity elements in the protective layer is preferably 10 atomic % or less, more preferably 5 atomic % or less, based on the protective layer components because then the deterioration of rewriting characteristics is slight.

In such a protective layer, the amount of $Al_2O_3$ or a material used in place thereof is preferably 30 atomic % relative to the amount of ZnS, to suppress the increase of jitter. The thickness of the entire protective layer is preferably 80–110 nm because the degree of modulation at the time of recording can be increased.

The protective layer material of the present Example can exert similar effects to those described above also when used in cases wherein the intermediate layer material of the recording medium of Example 1 is other than $Al_2O_3$, for example, a material comprising ZnS as the main component, e.g., $(ZnS)_{80}(SiO_2)_{20}$ or a material comprising $SiO_2$ as the main component. However, the effect of suppressing the increase of jitter in $10^5$ times of rewriting, which is an effect possessed by the $Al_2O_3$ layer of the intermediate layer, is small.

When the first reflective layer shown in Examples 2 and 3 and the protective layer of the present Example are combined, the effects of the both layers can be observed.

Not only in the disk of the structure shown in the present invention but also in disks of prior structure or in phase-change disks which additionally have a protective layer, when the $(ZnS)_{70}(Al_2O_3)_{30}$ layer is used as the protective layer the effect of decreasing the change of reflectivity which arises at the time of a large number of times of rewriting is observed. However, the effect of suppressing the increase of jitter in $10^5$ times of rewriting is small.

The protective layer of the present Example, also when used in a disk in which the second reflective layer is absent, gives effects similar to the above, although the thickness of the first reflective layer naturally needs to be changed so as to give a high degree of modulation of reproduced signals.

As to items not described in the present Example, the same applies as in Examples 1–4.

Example 6

Structure, preparation process

The following information recording medium was prepared in the same manner as in Example 1 except that $Al_2O_3$ used in the intermediate layer 4 of Example 1 was changed to $(Al_2O_3)_{80}(ZnS)_{20}$. Thus, to prepare the information recording medium of Example 5, on a polycarbonate substrate 1 12 cm in diameter, 0.6 mm in thickness and having a continuous groove on the surface were successively laminated a protective layer 2 consisting essentially of a $(ZnS)_{80}(SiO_2)_{20}$ layer of a thickness of about 100 nm, a recording layer 3 consisting essentially of an $Ag_2Ge_{20}Sb_{22}Te_{56}$ layer of a thickness of about 20 nm, an intermediate layer 4 consisting essentially of an $(Al_2O_3)_{80}(ZnS)_{20}$ layer of a thickness of about 25 nm, the first reflective layer 5 consisting essentially of Si of a thickness of about 80 nm and the second reflective layer 6 consisting essentially of an $Al_{97}Ti_3$ layer of a thickness of about 200 nm. Thus, a disk member was prepared. Then, the second reflective layers 6 and 6[1] of the first and the second disk members prepared by exactly the same method described above were laminated on each other to obtain a disk-formed information recording medium.

Read/write characteristics

The read/write characteristics were examined in the same manner as in Example 1. It was found that in the disk of the present Example the recording power could be reduced by 5% as compared with a disk wherein the intermediate layer material was $Al_2O_3$.

Intermediate layer material, etc.

In the present Example the intermediate layer 4 is formed with $(Al_2O_3)_{80}(ZnS)_{20}$. In such an intermediate layer, the proportion of ZnS or a material used in place thereof to be mixed is preferably not more than 70 atomic % relative to $Al_2O_3$ to suppress the increase of jitter. When the proportion is not less than 40 atomic %, the recording sensitivity improves over about 10%, but the thermal diffusion at the time of recording becomes slow as compared with that of a disk wherein the interlayer material is $Al_2O_3$ and resultantly the rise of jitter increased to double or more.

Materials other than described above which may be preferably used in place of $(Al_2O_3)_{80}(ZnS)_{20}$ are mixed materials of $Al_2O_3$ and $SiO_2$. The preferable range of mixing ratio is the same as in the case of ZnS. Secondly preferable are $Ta_2O_5$ and $(ZrO_2)_{97}(Y_2O_3)_3$. $La_2O_3$ and $GeO_2$ may also be used. The content of impurity elements in the intermediate layer is preferably 10 atomic % or less, more preferably 5 atomic % or less relative to the intermediate layer components to suppress the deterioration of rewriting characteristics.

When a disk having the protective layer shown in Examples 4 and 5 and the intermediate layer of the present Example are combined, the effects of both are observed. When the first reflective layer shown in Examples 2 and 3 and the intermediate layer of the present Example are combined, the effects of both are observed. When the first reflective layer shown in Examples 2 and 3, the protective layer shown in Examples 4 and 5 and the intermediate layer of the present Example are combined the effects of the whole are observed.

Not only in the disk of the structure shown in the present invention but also in a disk of prior structure and a phase-change disk which additionally has an intermediate layer, when an $(Al_2O_3)_{80}(ZnS)_{20}$ layer or the like is used as the intermediate layer material the following favorable effects can be observed: the decrease of recording sensitivity is smaller than in the case of $Al_2O_3$ intermediate layer, the change of reflectivity in $10^5$ times of rewriting can be decreased, and the recording power margin is widened. However, the increase of jitter is somewhat larger than in the disk of the structure shown in the present invention.

The intermediate layer of the present Example exerts similar effects to the above even when used in the absence of the second reflective layer, although the thickness of the first reflective layer naturally needs to be increased so as to give a high degree of modulation of reproduced signals.

As to items not described in the present Example, the same applies as in Examples 1–5.

Example 7

Structure, preparation process

The following information recording medium was prepared in the same manner as in Example 1 except that a part of the side of the intermediate layer 4 in Example 1 which was opposite to the $Al_2O_3$ recording layer was changed to ZnS. Thus, to prepare the information recording medium of Example 7, on a polycarbonate substrate 1 12 cm in diameter, 0.6 mm in thickness and having a continuous groove on the surface were successively laminated a protective layer 2 consisting essentially of a $(ZnS)_{80}(SiO_2)_{20}$ layer of a thickness of about 100 nm, a recording layer 3 consisting essentially of an $Ag_2Ge_{20}Te_{56}$ layer of a thickness of about 20 nm, an intermediate layer 4 consisting essentially of an $Al_2O_3$ layer about 10 nm in thickness and a $(ZnS)_{80}(SiO_2)_{20}$ layer about 20 nm in thickness, the first reflective layer 5 consisting essentially of Si of a thickness of about 80 nm and the second reflective layer 6 consisting essentially of an $Al_{97}Ti_3$ layer of a thickness of about 200 nm. Thus, a disk member was prepared. Then, the second reflective layers 6 and 6' of the first and the second disk members obtained by exactly the same method described above were laminated on each other to obtain a disk-formed information recording medium.

Read/write characteristics

The read/write characteristics were examined in the same manner as in Example 1. It was found that the disk of the present Example could decrease the recording power by 5% as compared with a disk in which the intermediate layer material was entirely $Al_2O_3$.

When a disk having the protective layer shown in Examples 4 and 5 and the intermediate layer of the present Example are combined the effects of both can be observed. When the first reflective layer shown in Examples 2 and 3, the protective layer shown in Examples 4 and 5, and the intermediate layer of the present Example are combined, the effects of the whole can be observed. Further, not only in the disk of the structure shown in the present invention but also in disks of prior structure and phase-change disks which additionally have an intermediate layer, when a layer formed with $Al_2O_3$ and $(ZnS)_{80}(SiO_2)_{20}$ is used as the intermediate layer, the effect of decreasing the recording power is observed.

Protective layer material, etc.

In the present Example, the intermediate layer is formed with $(ZnS)_{80}(SiO_2)_{20}$ and $Al_2O_3$. Materials which may be preferably used in place of $Al_2O_3$ are $SiO_2$ or mixed materials of $Al_2O_3$ and $SiO_2$, secondly $Ta_2O_5$ and $(ZrO_2)_{97}(Y_2O_3)_2$. $La_2O_3$ and $GeO_2$ may also be used.

In such intermediate layers, the thickness of $Al_2O_3$ layer or a layer used in place thereof is preferably 2–15 nm to attain a recording power of a suitable value.

In particular, in the case where, in the disk of prior structure shown in FIG. 2, the intermediate layer is formed with $(ZnS)_{80}(SiO_2)_{20}$ and $Al_2O_3$, when the thickness of the entire intermediate layer was selected at 160–210 nm the read/write characteristics were found to improve.

When the disk having a protective layer shown in Examples 4 and 5 and the intermediate layer of the present Example are combined, the effects of the both can be observed. When the first reflective layer shown in Examples 2 and 3 and the intermediate layer of the present Example are combined the effects of the both can be observed. When the first reflective layer shown in Examples 2 and 3, the protective layer shown in Examples 4 and 5 and the intermediate layer of the present Example are combined, the effects of the whole can be observed.

Not only in the disk of the structure shown in the present invention but also in a disk of prior structure and a phase-change disk which additionally has an intermediate layer, when an intermediate layer as shown in the present Example is used the following effects can be observed: the decrease of recording sensitivity is smaller than in the case of $Al_2O_3$ intermediate layer, the change of reflectivity in $10^5$ times of rewriting can be decreased, and the recording power margin is widened; however, the increase of jitter is somewhat larger than in the disk of the structure shown in the present invention.

The intermediate layer of the present Example exerts similar effects to the above even when used in the absence of the second reflective layer, although the thickness of the first reflective layer naturally needs to be increased so as to attain a high degree of modulation of reproduced signals.

As to items not described in the present Example, the same applies as in Examples 1–6.

Example 8
Structure, preparation process

The following information recording medium was prepared in the same manner as in Example 1 except that the preparation process for the protective layer was changed. Thus, to prepare the information recording medium of Example 8, on a polycarbonate substrate 1 12 cm in diameter, 0.6 mm in thickness and having a continuous groove on the surface were successively laminated a protective layer 2 consisting essentially a $(ZnS)_{80}(SiO_2)_{20}$ layer of a thickness of about 100 nm, a recording layer 3 consisting essentially of an $Ag_2Ge_{20}Sb_{22}Te_{56}$ layer of a thickness of about 20 nm, an intermediate layer 4 consisting essentially of an $Al_2O_3$ layer of a thickness of about 25 nm, the first reflective layer 5 consisting essentially of Si of a thickness of about 80 nm and the second reflective layer 6 consisting essentially of an $Al_{97}Ti_3$ layer of a thickness of about 200 nm. Thus a disk member was obtained.

The protective layer 2 was formed by a method which comprises forming the protective layer material in a thickness layer thicker by 5 nm than that ultimately intended and then conducting sputtering in the reverse direction, that is, in the direction in which the substrate material side is etched, thereby etching the 5 nm thickness of the protective material which has been deposited in excess, to obtain a proper layer thickness. Though this method requires extra time for preparation, it is advantageous in that the protective layer surface can be made more smooth and resultantly the disk noise can be decreased. The extra layer thickness to be deposited is preferably not less than 1 nm and not more than 50 nm. When the thickness is 3 nm or more the surface can be made more smooth, and when it is 20 nm or less a better reproducibility of thickness can be obtained in forming the protective layer.

Then, the second reflective layers 6 and 6¹ of the first and the second disk members prepared in exactly the same method described above were laminated on each other to obtain a disk-formed information recording medium.
Read/write characteristic The read/write characteristics were examined in the same manner as in Example 1. It was found that in the disk of the present Example the disk noise could be reduced by 2 dB as compared with a case wherein the protective layer was formed by conventional methods.

Not only in a disk of the structure shown in the present invention but also in disks of prior structure and phase-change disks which additionally have a protective layer, the effect of decreasing the disk noise can be observed when the protective layer is formed by the method shown in the present Example.

The intermediate layer of the present invention exerts similar effects to the above even when used in the absence of the second reflective layer, though the layer thickness of the second reflective layer naturally needs to be changed so as to attain a high degree of modulation of reproduced signals.

As to items not described in the present Example, the same applies as in Examples 1–7.

Example 9
Structure, preparation process

The following information recording medium was prepared in the same manner as in Example 1 except for changing the preparation process for the second reflective layer 5. Thus, to prepare the information recording medium of Example 9, on a polycarbonate substrate 1 12 cm in diameter, 0.6 mm in thickness and having a continuous groove on the surface were successively laminated a protective layer 2 consisting essentially of a $(ZnS)_{80}(SiO_2)_{20}$ layer of a thickness of about 100 nm, a recording layer 3 consisting essentially of an $Ag_2Ge_{20}Sb_{22}Te_{56}$ layer of a thickness of about 20 nm, an intermediate layer 4 consisting essentially of an $Al_2O_3$ layer of a thickness of about 25 nm, the first reflective layer 5 consisting essentially of Si of a thickness of about 80 nm and the second reflective layer 6 consisting essentially of an $Al_{97}Ti_3$ layer of a thickness of about 80 nm. Thus a disk member was obtained.

Then, the second reflective layers 6 and 6' of the first and the second disk members prepared in exactly the same method described above were laminated on each other to obtain a disk-formed information recording medium.

Figure 9:
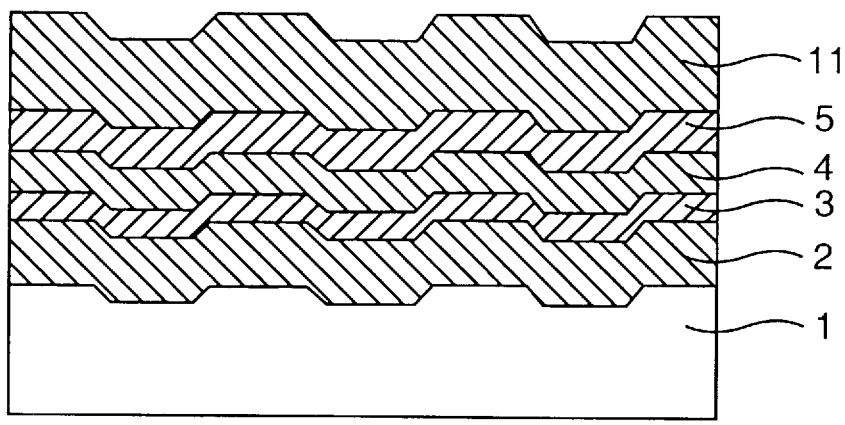
FIGS. 9A and 9B are respectively a diagram showing a part of the process for preparing the information recording medium of Example 9 of the present invention.
Figure 9:
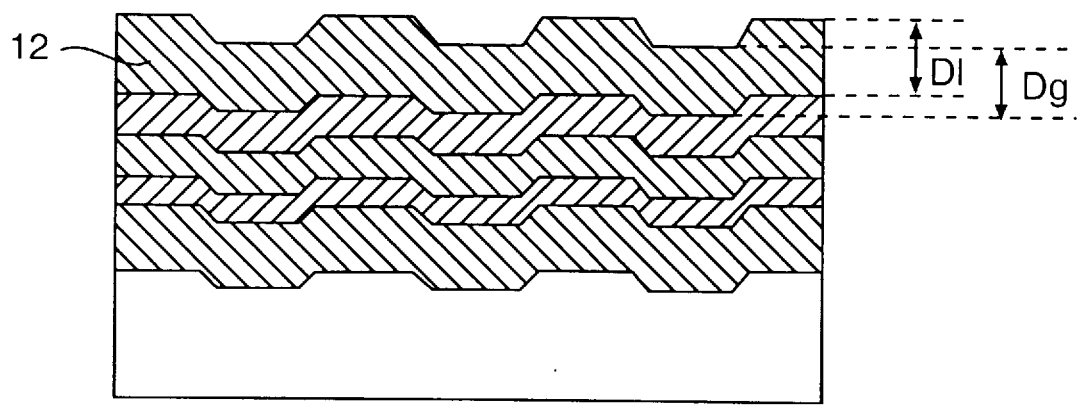

As shown in FIG. 9, the first reflective layer 5 was formed by a method which comprises forming the first reflective material in a thickness larger by 30 nm than ultimately intended (FIG. 9(a)) and then conducting etching in the reverse direction, that is, in the direction in which the substrate side material is etched, thereby etching the protective material which has been deposited in excess, to obtain a proper layer thickness. Resultantly the first reflective layer material 9 assumes the shape shown in FIG. 10. In this case, since the etching rate is higher at the groove part than at the land part, the ultimate layer thickness, as shown in FIG. 9(b), was about 77 nm at the groove part (Dg) and about 83 nm at the land part (Dl), the average thickness of the two being 80 nm. Thus, an information recording medium in which the first reflective layer thickness is different between the land part and the groove part was prepared. The difference of layer thickness between the land part and the groove part is preferably not less than 2 nm, more preferably not less than 5 nm, to attain more enhanced read/write characteristics.
Read/write characteristic The read/write characteristics were examined in the same manner as in Example 1. It was found that, since the disk of the present Example has a first reflective layer thickness different between the land part and the groove part, it can maintain both a good read/write characteristic at the land part and a good read/write characteristic at the groove part as compared with a disk in which the layer thicknesses at the two parts are equal. Resultantly, the carrier-to-noise ratio (C/N) improved by 1 dB at the land part and the groove part, respectively.

The effect of improving C/N can be observed not only in a disk of the structure shown in the present invention but also in a phase-change disk which additionally has the first reflective layer when the layer is formed by the method shown in the present Example.

The preparation process of the present Example exerts similar effects to the above even when used in the absence of the second reflective layer although the thickness of the first reflective layer naturally needs to be increased so as to give a high degree of modulation of reproduced signals.

As to items not described in the present Example, the same applies as in Examples 1–8.

Example 10

Structure, preparation process

The following information recording medium was prepared in the same manner as in Example 1 except that AlTi in the second reflective layer was changed to Mo and the thickness of the first reflective layer and the second reflective layer were changed. Thus, to prepare the information recording medium of Example 10, on a polycarbonate substrate 1 of 12 cm in diameter, 0.6 mm in thickness and having a continuous groove on the surface were successively laminated a protective layer 2 consisting essentially of a $(ZnS)_{80}(SiO_2)_{20}$ layer of a thickness of about 100 nm, a recording layer 3 consisting essentially of an $Ag_2Ge_{20}Sb_{22}Te_{56}$ layer of a thickness of about 20 nm, an intermediate layer 4 consisting essentially of an $Al_2O_3$ layer of a thickness of about 25 nm, the first reflective layer 5 consisting essentially of Si of a thickness of about 80 nm and the second reflective layer 6 consisting essentially of an Mo layer of a thickness of about 200 nm. Thus a disk member was obtained. Then the second reflective layers 6 and 6' of the first and the second disk members obtained by exactly the same method described above were laminated on each other to obtain a disk-formed information recording medium.

The disk-formed information recording medium of prior structure used for comparison was the same as in Example 1. The method used for recording-reading back of information was also the same as in Example 1.

Initial crystallization

The method used for initial crystallization was also the same as in Example 1. In the information recording medium of Example 10, the reflectivity (Ra) is lower in a wider range than in the information recording medium of FIG. 1 of Example 1, so that the initial crystallization can be effected with low laser power in a wider laser wavelength range. It was found that in an initial crystallization apparatus which has a light source of a wavelength (e.g., about 810 nm) distant from the laser wavelength (630–680 nm) used for recording-reading back the sensitivity to initial crystallization power was improved by 10% or more.

Read/write characteristic

The read/write characteristics were examined in the same manner as in Example 1. It was found that, as in Example 1, the jitter value could be decreased in the present disk as compared with that in disks of prior structure.

Spectral characteristics

Two test pieces were prepared which were of the same structure as the above-mentioned disk member except that the substrate material was changed to glass, to examine their spectral characteristics (FIG. 5). Thus, on an optically polished glass plate abut 1 mm in thickness used as the substrate was formed a protective layer 2 consisting essentially of a $(ZnS)_{80}(SiO_2)_{20}$ layer in a thickness of about 100 nm. Then, successively thereon were formed in the same manner as in the above-mentioned disk member, an $Ag_2Ge_{20}Sb_{22}Te_{56}$ recording layer 3 in a thickness of about 20 nm, an intermediate layer 4 consisting essentially of an $Al_2O_3$ layer in a thickness of about 25 nm, the first reflective layer 5 consisting essentially of Si in a thickness of about 80 nm and the second reflective layer 6 consisting essentially of an Mo layer in a thickness of about 200 nm. One of the test pieces thus obtained was kept untreated and the other was heat-treated at 300° C. for 5 minutes. The respective test pieces were irradiated with light from the substrate side and examined for their wavelength dependency of reflectivity. The reflectivity of the heat-treated test piece was indicated as Rc and that of the untreated one as Rc. When heat treatment is applied, the same optical characteristics as those obtained when the initial crystallization was conducted are obtained.

Consequently, it was found that in the disk having good rewriting characteristics described in the present Example the reflectivity had the minimum in the wavelength range of 550 nm–800 nm. At the recording-reading back wavelength, the reflectivity of the untreated test piece (Ra) was found to be 10% or less and the reflectivity of the heat-treated one (Rc) 15% or more.

In the disk having good rewriting characteristics described in the present Example, the disk member was peeled apart between the recording layer and the intermediate layer and reflectivity was determined from the intermediate layer side toward the reflective layer (Rupl). Reflectivity was also determined in the case wherein the disk member was peeled apart between the intermediate layer and the reflective layer (Rref). It was found that the wavelength dependency of reflectivity was observed and the reflectivity had the maximum value in the wavelength range of 500 nm–800 nm. When the disk member was peeled apart between the recording layer and the intermediate layer and reflectivity was determined from the intermediate layer side toward the reflective layer, sometimes the maximum value was difficult to discern. In such a case, the result of determination obtained when the disk member was peeled apart between the intermediate layer and the reflective layer was referred to.

The results of determination made with a disk of prior structure are as described above in Example 1. Thus, it was revealed that the spectral characteristics of the disk having good rewriting characteristics described in the present Example were different from those of a disk of prior structure.

As to items not described in the present Example, the same applies as in Examples 1–9.

Also when the first reflective layer, protective layer and intermediate layer of the present Example were changed as described in Examples 2–7, similar effects to those of Examples 2–7 were obtained.

Example 11

Structure, preparation process

Figure 10:
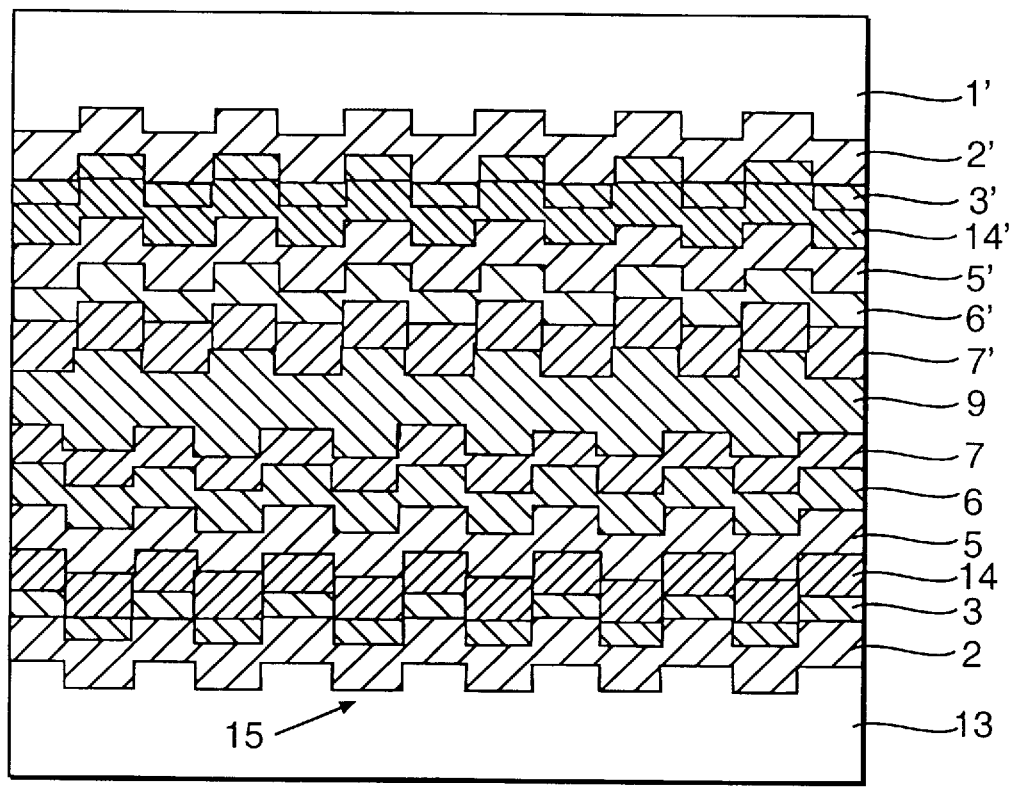
FIG. 10 is a sectional view showing the structure of the information recording medium of Example 11 of the present invention.

FIG. 10 is a sectional view showing the structure of a disk-formed information recording medium using an information recording thin layer which uses the mask layer for ultrahigh resolution reading of the present Example. This medium is exactly the same as what is obtainable by changing the substrate 1 of Example 1 to a polycarbonate substrate 11 of 12 cm in diameter, 0.6 mm in thickness and having information recorded on the surface with ruggedness as recording pits 13. Thus, to prepare the information recording medium of Example 11, on the substrate 11 described above were successively laminated a protective layer consisting essentially of a $(ZnS)_{80}(SiO_2)_{20}$ layer of a thickness of about 100 nm, an ultrahigh resolution reading mask layer 12 consisting essentially of an $Ag_2Ge_{20}Sb_{22}Te_{56}$ layer of a thickness of about 20 nm, an intermediate layer 4 consisting essentially of an $Al_2O_3$ layer of a thickness of about 25 nm, the first reflective layer 5 consisting essentially of Si of a thickness of about 80 nm and the second reflective layer 6 consisting essentially of an $Al_{97}Ti_3$ layer of a thickness of about 200 nm. Thus a disk member was obtained. Then the second reflective layers 6 and 6' of the first and the second disk members obtained by exactly the same method as described above were laminated an each other to obtain a disk-formed information recording medium.

The disk-formed information recording medium of prior structure used for comparison was the same as what is obtainable by changing the substrate of the medium of example 1.

Initial crystallization

The method for initial crystallization was also the same as in Example 1. Thus, in place of the recording layers 3 and 3', the ultrahigh resolution reading mask layers 12 and 12' were subjected to initial crystallization.

Ultrahigh resolution reading

Then, ultrahigh resolution reading of information was conducted by irradiating the record region of the ultrahigh resolution reading mask layer 12 which had finished initial crystallization as described above with reading layer light at a power of 14 mM while conducting tracking and automatic focusing in the same manner as described before. When the laser light had gone past the part to be read out, the laser light power was reduced to the low power level (1 mW) of tracking laser light. The reduction of laser light power was effective in preventing the deterioration of the mask layer for ultrahigh resolution reading.

In a disk in which the layer remains amorphousized after ultrahigh resolution reading has been conducted, crystallization was conducted by irradiating once at a power (7 mW) of crystallization level. In a disk in which the layer remains crystallized after ultrahigh resolution reading has been conducted, the crystallization was unnecessary.

This method is effective not only for the recording layer of the present invention but also for other recording layers.

In the information recording medium of the present Example, even when ultrahigh resolution reading was repeated $10^3$ times or more under a severe condition of using a laser power 15% higher than the optimum value, the change of reflectivity could be reduced as compared with that in disks of prior structure and the possible number of times of ultrahigh resolution reading could be increased to as high as $10^4$.

Ultrahigh resolution reading mask layer material

As to materials for ultrahigh resolution reading layer which can be used in place of the $Ag_2Ge_{20}Sb_{22}Te_{56}$ layer used in the ultrahigh resolution reading mask layers 12 and 12', Ag—Ge—Sb—Te type materials in which the composition ratio is varied, for example, $Ag_5Ge_{20}Sb_{20}Te_{55}$ and $Ag_1Ge_{21}Sb_{23}Te_{55}$, tend little to show the decrease of possible number of times of reading. When the proportion of Ag is increased, incomplete erasing tends to increase though the reading sensitivity improves. When the proportion of Ag is decreased, the reading sensitivity decreases. In Ag—Ge—Sb—Te type materials it was found that materials of a composition in the range of 1–5 atomic % of Ag, 17–23 atomic % of Ge, 19–25 atomic % of Sb and 53–59 atomic % of Te tended particularly little to show the decrease of possible number of times of ultrahigh resolution reading.

Next, similar results were also obtained when Cr—Sb—Te type materials, e.g., $(Cr_4Te_5)_{10}(Ge_2Sb_2Te_5)_{90}$, Co—Ge—Sb—Te, V—Ge—Sb—Te and the like were used.

Further, characteristic properties near thereto can also be obtained when the masking layer material is replaced with a material of at least one composition selected from $Ge_2Sb_2Te_5$, $GeSb_2Te_4$, $GeSb_4Te_7$, $In_3SbTe_2$, $In_{35}Sb_{32}Te_{33}$, $In_{31}Sb_{26}Te_{43}$, GeTe, Ag—In—Sb—Te, Ni—Ge—Sb—Te, Pt—Ge—Sb—Te, Si—Ge—Sb—Te, Au—Ge—Sb—Te, Cu—Ge—Sb—Te, Mo—Ge—Sb—Te, Mn—Ge—Sb—Te, Fe—Ge—Sb—Te, Ti—Ge—Sb—Te, Bi—Ge—Sb—Te and compositions near thereto or when a part of Ge is replaced with In.

Further, ultrahigh resolution reading layers which comprise a phase-changeable component containing Ge—Sb—Te as the main constituent and a high melting component having a higher melting point added thereto tend little to show the decrease of possible number of times of ultrahigh resolution reading. The reading layer tends still less to show the decrease of possible number of times of ultrahigh resolution reading when 95% or more of the total number of atoms of the phase-changeable component constitute a combination of GeTe and $Sb_2Te_3$ and 95% or more of the total number of atoms of the high melting component constitute at least one composition selected from Cr—Te, Cr—Sb, Cr—Ge, Cr—Sb—Te, Cr—Sb—Ge, Cr—Ge—Te, Co—Te, Co—Sb, Co—Ge, Co—Sb—Te, Co—Sb—Ge, Co—Ge—Te, Cu—Te, Cu—Sb, Cu—Ge, Cu—Sb—Te, Cu—Sb—Ge, Cu—Ge—Te, Mn—Te, Mn—Sb, Mn—Ge, Mn—Sb—Te, Mn—Sb—Ge, Mn—Ge—Te, V—Te, V—Sb, V—Ge, V—Sb—Te, V—Sb—Ge, V—Ge—Te, Ni—Te, Ni—Sb, Ni—Ge, Ni—Sb—Te, Ni—Sb—Ge, Ni—Ge—Te, Mo—Te, Mo—Sb, Mo—Ge, Mo—Sb—Te, Mo—Sb—Ge, Mo—Ge—Te, W—Te, W—Sb, W—Ge, W—Sb—Te, W—Sb—Ge, W—Ge—Te, Ag—Te, Ag—Sb, Ag—Ge, Ag—Sb—Te, Ag—Sb—Ge and Ag—Ge—Te or a composition near thereto. It was found that Cr—Te as $Cr_4Te_5$, $Cr_2Te_3$ and $Cr_5Te_8$ were particularly preferable because they tended particularly less to show the decrease of the possible number of times of ultrahigh resolution reading. It was also found that $Ag_2Te$, $AgSbTe_2$ or the like gave a high signal strength even with a light source of shorter wavelength, Ag—Te and Ag—Sb—Te being particularly preferable.

When the composition which constitute 95% or more of the total number of atoms of the phase-changeable component is $Ge_2Sb_2Te_5$, a good ultrahigh resolution reading characteristic is obtained when the proportion of the number of atoms of the high melting component to the total number of atoms in the ultrahigh resolution is not less than 5 atomic % and not more than 20 atomic %. Particularly when the proportion is not less than 5 atomic % and not more than 15 atomic %, a good crystallization characteristics and hence a still better ultrahigh resolution reading characteristic can be obtained.

The thickness of the ultrahigh resolution reading mask layer is preferably not less than 15 nm and not more than 50 nm because a high degree of modulation can be obtained and the layer hardly undergoes flowing. When the thickness of the layer is not less than 15 nm and not more than 40 nm the layer has an advantage in that the absorptivity at the crystalline state readily becomes equal to or higher than the absorptivity at the amorphous state.

Ultrahigh resolution reading disk of other structure

Whereas the disk of the present Example is of the same structure as what is obtainable by changing the disk shown in the FIG. 1 of Example 1 to the substrate 11, similar effects can also be obtained when ultrahigh resolution reading disk of the structure described in Examples 2–10 are prepared by replacing the substrate 1 with the substrate 11.

Though, in the present Example, two disk members are prepared by exactly the same method and the reflecture layers 6 and 6' of the first and the second disk members described above are laminated on each other via an adhesive layer, disk members of other structure, substrates for protection or recording-reading back disks other than the ultrahigh resolution disk may be used in place of the second disk member. Further, in FIG. 10, when the substrate 11 is replaced with the substrate 1 of Example 1 and the ultrahigh resolution reading layer is replaced with a combination of three layers of an ultrahigh resolution reading layer, intermediate layer and recording layer or of a recording layer, intermediate layer and ultrahigh resolution recording mask layer, an information recording medium capable of ultrahigh resolution reading and recording is obtained.

As to items not described in the present Example, the same applies as in Examples 1–10.

The layer of the present Example can exert the aforesaid effects to some extent even when used in the absence of the second reflective layer, although the thickness of the first reflective layer naturally needs to be changed so as to give a high degree of modulation of reproduced signals and also the possible number of times of reading decreases.

As set forth above, the information recording medium of the present invention makes it possible to attain a larger number of times of rewriting than previously while retaining good recording-reading back characteristics or good ultrahigh resolution reading characteristics.

The information recording-reading back apparatus of the present invention enables the information recording medium of the present invention to retain good recording-reading back characteristics or good ultrahigh resolution reading characteristics even after a layer number of times of rewriting than previously.

What is claimed is:

1. An information recording medium which comprises as a recording layer an information recording thin layer, formed on a substrate directly or via an underlayer, which records and/or reads back information through the use of atomic arrangement change caused by the irradiation of energy beams, a protective layer and at least two reflective layers, the reflective layers comprising a first reflective layer and a second reflective layer, the materials of which differ in refractive index or extinction coefficient or both, the aforesaid layers being laminated in the order, from the side of light incidence, of the protective layer, the recording layer, an intermediate layer, the first reflective layer and the second reflective layer, and wherein the intermediate layer consists essentially of two layers of a $ZnS$—$SiO_2$ layer and an Al oxide layer.

2. An information recording medium which comprises as a recording layer an information recording thin layer, formed on a substrate directly or via an under layer, which records and/or reads back information through the use of atomic arrangement change caused by the irradiation of energy beams, a protective layer and at least two reflective layers, the reflective layers comprising a first reflective layer and a second reflective layer, the materials of which differ in refractive index or extinction coefficient or both, the aforesaid layers being laminated in the order, from the side of light incidence, of the protective layer, the recording layer, an intermediate layer, the first reflective layer and the second reflective layer, and wherein a component which constitutes 30% or more of the total number of atoms of the intermediate layer has a composition of Al—O.

3. An information recording medium which comprises as a recording layer an information recording thin layer, formed on a substrate directly or via an under layer, which records and/or reads back information through the use of atomic arrangement change caused by the irradiation of energy beams, a protective layer and at least two reflective layers, the reflective layers comprising a first reflective layer and a second reflective layer, the materials of which differ in refractive index or extinction coefficient or both, the aforesaid layers being laminated in the order, from the side of light incidence, of the protective layer, the recording layer, an intermediate layer, the first reflective layer and the second reflective layer, and wherein the component(s) which constitute(s) 90% or more of the total number of atoms of the intermediate layer has (have) a compositions near to at least on of the composition $(ZnS)$—$(Al_2O_3)$, $(ZnS)$—$(Al_2O_3)$—$(SiO_2)$ and $(Al_2O_3)$—$(SiO_2)$.

4. An information recording medium which comprises as a recording layer an information recording thin layer, formed on a substrate directly or via an under layer, which records and/or reads back information through the use of atomic arrangement change caused by the irradiation of energy beams, a protective layer and at least two reflective layers, the reflective layers comprising a first reflective layer and a second reflective layer, the materials of which differ in refractive index or extinction coefficient or both, the aforesaid layers being laminated in the order, from the side of light incidence, of the protective layer, the recording layer, and then, directly or via an intermediate layer, the first reflective layer and the second reflective layer, and wherein the protective layer consists essentially of a material which contains 30 atomic % or more, of the total number of atoms, of Al—O.

5. An information recording medium which comprises as a recording layer an information recording thin layer, formed on a substrate directly or via an under layer, which records and/or reads back information through the use of atomic arrangement change caused by the irradiation of energy beams, a protective layer and at least two reflective layers, the reflective layers comprising a first reflective layer and a second reflective layer, the materials of which differ in refractive index or extinction coefficient or both, the aforesaid layers being laminated in the order, from the side of light incidence, of the protective layer, the recording layer, and then, directly or via an intermediate layer, the first reflective layer and the second reflective layer, and wherein the protective layer consists essentially of a $ZnS$—$SiO_2$ layer and an Al—O layer.

6. The information recording medium according to claim 5 wherein the thickness of the Al—O layer in the protective layer is not less than 2 nm and not more than 20 nm.

7. An information recording medium which comprises as a recording layer an information recording thin layer, formed on a substrate directly or via an under layer, which records and/or reads back information through the use of atomic arrangement change caused by the irradiation of energy beams, a protective layer and at least two reflective layers, the reflective layers comprising a first reflective layer and a second reflective layer, the materials of which differ in refractive index or extinction coefficient or both, the aforesaid layers being laminated in the order, from the side of light incidence, of the protective layer, the recording layer, and then, directly or via an intermediate layer, the first reflective layer and the second reflective layer, and wherein the component(s) which constitute(s) 90% or more of the total number of atoms of the protective layer has (have) a composition near to at least one of the compositions $(ZnS)$—$(Al_2O_3)_1$ and $(ZnS)$—$(Al_2O_3)$—$(SiO_2)$.

8. An information recording medium which comprises as a recording layer an information recording thin layer, formed on a substrate directly or via an under layer, which records and/or reads back information through the use of atomic arrangement change caused by the irradiation of energy beams, a protective layer and at least two reflective layers, the reflective layers comprising a first reflective layer and a second reflective layer, the materials of which differ in refractive index or extinction coefficient or both, the aforesaid layers being laminated in the order, from the side of light incidence, of the protective layer, the recording layer, and then, directly or via an intermediate layer, the first reflective layer and the second reflective layer, and wherein the thickness of the protective layer is in the range of not less than 80 nm and not more than 110 nm.

9. An information recording medium which comprises as a recording layer an information recording thin layer, formed on a substrate directly or via an under layer, which records and/or reads back information through the use of atomic arrangement change caused by the irradiation of energy beams, a protective layer and at least two reflective layers, the reflective layers comprising a first reflective layer and a second reflective layer, the materials of which differ in refractive index or extinction coefficient or both, the aforesaid layers being laminated in the order, from the side of light incidence, of the protective layer, the recording layer, an intermediate layer, the first reflective layer and the second reflective layer, and wherein the thickness of the intermediate layer is in the range of not less than 15 nm and not more than 30 nm.

10. An information recording medium which comprises as a recording layer an information recording thin layer, formed on a substrate directly or via an under layer, which records and/or reads back information through the use of atomic arrangement change caused by the irradiation of energy beams, a protective layer and at least two reflective layers, the reflective layers comprising a first reflective layer and a second reflective layer, the materials of which differ in refractive index or extinction coefficient or both, the aforesaid layers being laminated in the order, from the side of light incidence, of the protective layer, the recording layer, and then, directly or via an intermediate layer, the first reflective layer and the second reflective layer, and wherein the thickness of the first reflective layer is in the range of not less than 60 nm and not more than 90 nm.

11. An information recording medium which comprises as a recording layer an information recording thin layer, formed on a substrate directly or via an under layer, which records and/or reads back information through the use of atomic arrangement change caused by the irradiation of energy beams, a protective layer and at least two reflective layers, the reflective layers comprising a first reflective layer and a second reflective layer, the materials of which differ in refractive index or extinction coefficient or both, the aforesaid layers being laminated in the order, from the side of light incidence, of the protective layer, the recording layer, and then, directly or via an intermediate layer, the first reflective layer and the second reflective layer, and wherein the first reflective layer is formed such that the layer thickness at a land part is 2 nm or more larger than that at a groove part.

12. An information recording medium which comprises as a recording layer an information recording thin layer, formed on a substrate directly or via an underlayer, which records and/or reads back information through the use of atomic arrangement change caused by the irradiation of energy beams, a protective layer and at least two reflective layers, the reflective layers comprising a first reflective layer and a second reflective layer, the materials of which differ in refractive index or extinction coefficient or both, the aforesaid layers being laminated in the order, from the side of light incidence, of the protective layer, the recording layer, an intermediate layer, the first reflective layer and the second reflective layer, wherein the intermediate layer provided between the recording layer and the first reflective layer comprises (i) a $ZnS$—$SiO_2$ layer and (ii) a layer comprising any one of $SiO_2$, a mixture of $Al_2O_3$ and $SiO_2$, $Ta_2O_5$, $(ZrO_2)_{97}(Y_2O_3)_3$, $La_2O_3$ and $GeO_2$.

13. An information recording medium which comprises as a recording layer an information recording thin layer, formed on a substrate directly or via an underlayer, which records and/or reads back information through the use of atomic arrangement change caused by the irradiation of energy beams, a protective layer and at least two reflective layers, the reflective layers comprising a first reflective layer and a second reflective layer, the materials of which differ in refractive index or extinction coefficient or both, the aforesaid layers being laminated in the order, from the side of light incidence, of the protective layer, the recording layer, an intermediate layer, the first reflective layer and the second reflective layer, wherein the intermediate layer provided between the recording layer and the first reflective layer comprises a mixture of $Al_2O_3$ and $SiO_2$, and a component which constitutes 30% or more of the total number of atoms of the intermediate layer has a composition of Al—O.

14. An information recording medium which comprises as a recording layer an information recording thin layer, formed on a substrate directly or via an underlayer, which records and/or reads back information through the use of atomic arrangement change caused by the irradiation of energy beams, a protective layer and at least two reflective layers, the reflective layers comprising a first reflective layer and a second reflective layer, the materials of which differ in refractive index or extinction coefficient or both, the aforesaid layers being laminated in the order, from the side of light incidence, of the protective layer, the recording layer, an intermediate layer, the first reflective layer and the second reflective layer, wherein the intermediate layer is provided between the recording layer and the first reflective layer and 90% or more of the components of the intermediate layer is $Ta_2O_3$, $(ZrO_2)_{97}(Y_2O_3)_3$, $La_2O_3$ or $GeO_2$.

15. An information recording medium which comprises as a recording layer an information recording thin layer, formed on a substrate directly or via an underlayer, which records and/or reads back information through the use of atomic arrangement change caused by the irradiation of energy beams, a protective layer and at least two reflective layer, the reflective layers comprising a first reflective layer and a second reflective layer, the materials of which differ in refractive index or extinction coefficient or both, the aforesaid layers being laminated in the order, from the side of light incidence, of the protective layer, the recording layer and then, directly or via an intermediate layer, the first reflective layer and the second reflective layer, wherein the protective layer comprises any one of a mixture of $Al_2O_3$ and $SiO_2$, a mixture of $Al_2O_3$, $SiO_2$ and ZnS, a mixture of $Ta_2O_3$, $(ZrO_2)_{97}(Y_2O_3)_3$, $La_2O_3$, $GeO_2$, $(ZnS)_{70}(Al_2O_3)_{30}$ and $Ta_2O_3$, a mixture of $(ZnS)_{70}(Al_2O_3)_{30}$ and $La_2O_3$, and a mixture of $(ZnS)_{70}(Al_2O_3)_{30}$ and $GeO_2$.

16. An information recording medium which comprises as a recording layer an information recording thin layer, formed on a substrate directly or via an underlayer, which records and/or reads back information through the use of atomic arrangement change caused by the irradiation of energy beams, a protective layer and at least two reflective layers, the reflective layers comprising a first reflective layer and a second reflective layer, the materials of which differ in refractive index or extinction coefficient or both, the aforesaid layers being laminated in order, from the side of light incidence, of the protective layer, the recording layer and then, directly or via an intermediate layer, the first reflective layer and the second reflective layer, wherein the protective layer comprises (i) a $ZnS—SiO_2$ layer and (ii) a layer comprising any one of $SiO_2$, a mixture of $Al_2O_3$ and $SiO_2$, a mixture of $Al_2O_3$ and ZnS, $Ta_2O_5$, $(ZrO_2)_{97}(Y_2O_3)_3$, $La_2O_3$ or $GeO_2$.

17. The information recording medium according to claim 16 wherein the layer composed of $SiO_2$, a mixture of $Al_2O_3$ and $SiO_2$, a mixture of $Al_2O_3$ and ZnS, $Ta_2O_5$, $(ZrO_2)_{97}(Y_2O_3)_3$, $La_2O_3$ or $GeO_2$ has a thickness of 2 nm or more but 20 nm or less.

* * * * *